US012698197B2

(12) United States Patent
Gormley

(10) Patent No.: US 12,698,197 B2
(45) Date of Patent: Aug. 4, 2026

(54) FLUID DISPENSER

(71) Applicant: Starbucks Corporation, Seattle, WA (US)

(72) Inventor: Joseph E. Gormley, Mercer Island, WA (US)

(73) Assignee: Starbucks Corporation, Seattle, WA (US)

( * ) Notice: Subject to any disclaimer, the term of this patent is extended or adjusted under 35 U.S.C. 154(b) by 335 days.

(21) Appl. No.: 18/353,350

(22) Filed: Jul. 17, 2023

(65) Prior Publication Data

US 2024/0025725 A1 Jan. 25, 2024

Related U.S. Application Data

(60) Provisional application No. 63/368,837, filed on Jul. 19, 2022.

(51) Int. Cl.
*B67D 3/00* (2006.01)

(52) U.S. Cl.
CPC .................................. *B67D 3/0032* (2013.01)

(58) Field of Classification Search
CPC ........ B67D 3/0032; B67D 2210/00044; B67D 3/0035; B67D 3/0061; B67D 3/045
See application file for complete search history.

(56) References Cited

U.S. PATENT DOCUMENTS

| | | | | |
|---|---|---|---|---|
| 1,553,113 A * | 9/1925 | Rutt | A47K 5/1214 222/511 |
| 6,230,944 B1 * | 5/2001 | Castellano | B65D 47/243 222/481.5 |
| 2002/0125271 A1 * | 9/2002 | Zeitlin | A47K 5/1204 222/1 |
| 2004/0217311 A1 * | 11/2004 | Lu | F16K 31/04 251/129.11 |
| 2010/0254730 A1 * | 10/2010 | Centofante | G03G 15/0848 399/260 |
| 2017/0030483 A1 * | 2/2017 | Yeh | F16K 3/24 |

FOREIGN PATENT DOCUMENTS

| | | | |
|---|---|---|---|
| CN | 101985322 A * | 3/2011 | B67D 3/0032 |
| ES | 2646920 A1 * | 12/2017 | B67D 3/0029 |
| WO | WO 2024/020335 A2 | 1/2024 | |

OTHER PUBLICATIONS

International Search Report and Written Opinion in application No. PCT/US2023/070310, mailed on Jan. 19, 2024, in 22 pages.
International Preliminary Report on Patentability and Written Opinion in application No. PCT/US2023/070310, dated Dec. 18, 2024, in 12 pages.

* cited by examiner

*Primary Examiner* — Bob Zadeh
(74) *Attorney, Agent, or Firm* — Knobbe, Martens, Olson & Bear, LLP

(57) ABSTRACT

An apparatus for dispensing a liquid can include a dispenser coupled to a container. The dispenser can be configured to move between an open position and a closed position. In the open position, the dispenser can be configured to dispense the liquid. The container can be in an inverted position such that an opening of the container is facing downward.

28 Claims, 20 Drawing Sheets

FLUID DISPENSER

CROSS-REFERENCE TO RELATED APPLICATION(S)

This application claims the benefit of U.S. Provisional Application No. 63/368,837, filed Jul. 19, 2022, which is hereby incorporated by reference herein in its entirety.

FIELD

The present disclosure relates to systems and methods for dispensing a fluid, such as, systems and methods for dispensing fluid from a container at room temperature or at temperatures colder than room temperature.

DESCRIPTION OF THE CERTAIN RELATED ART

Certain beverages are prepared with liquids that need to be frequently dispensed and/or kept at temperatures lower than room temperature. These liquids can include dairy or non-dairy. These liquids can be positioned within a container.

However, the process of dispensing liquids from a container be time consuming and labor intensive. The process can include moving the container from a storage area to an area for use. The process can also include opening the container, such as unscrewing or uncapping a cap of the container. The process can also include tilting or rotating the container to pour the liquid out of the container, such as with a spout or opening.

Additionally, the container may need to be stored at safe temperatures to keep product integrity and prevent spoilage. This can create operation inefficiencies for baristas by requiring opening and closing a refrigerator to remove and return the containers. Traditional refrigeration can also be costly to execute and sometimes access to refrigeration is not possible.

SUMMARY

The systems, methods and devices of this disclosure each have several innovative aspects, no single one of which is solely responsible for the desirable attributes disclosed herein.

In one aspect, an apparatus for dispensing a liquid, the apparatus can include a dispenser coupled to a container. The dispenser can be configured to move between an open position and a closed position. In the open position, the dispenser can be configured to dispense the liquid. The container can be in an inverted position such that an opening of the container is facing downward.

In some examples, the dispenser can be configured to be pulled into the open position and pushed into the closed position. The dispenser can be configured to be pushed into the open position and pulled into the closed position. The dispenser can be configured to be rotated into the open position and rotated into the closed position. The dispenser can include a cap and a tube. The cap includes an inner wall and an outer wall. The inner wall and the outer wall can be configured to be positioned on opposing sides of a lip of an opening of the container. The dispenser can further include a sealing plug and a check valve between the inner wall of the cap and the lip of the opening of the container. The sealing plug and the check valve can be removable from the dispenser. The inner wall of the cap can define an aperture in fluid communication with the opening of the container. The dispenser can further include a seal positioned within the aperture defined by the inner wall. The seal can include a central aperture. The central aperture of the seal can be configured to receive the tube in a sliding manner. The tube can include a side aperture on one end of the tube. The side aperture can be positioned within the container when the dispenser is in the open position. The side aperture can be positioned against the seal when the dispenser is in the closed position. The seal can have a complementary shape with the tube, wherein the tube is configured to interface with the seal when the dispenser is in the closed position. Each of the tube and the seal can include an off center aperture. The off center aperture of the tube can be aligned with the off center aperture of the tube when the dispenser is in the open position. Each of the tube and the seal can include an off center aperture. The off center aperture of the tube can be not aligned with the off center aperture of the tube when the dispenser is in the closed position.

In some examples, the dispenser can further include an air docking tube extending perpendicular to a length of the dispenser. The dispenser can include an air channel in fluid communication with an aperture of the air docking tube. The dispenser can further include an air curtain deflector configured to redirect air flowing through the air channel. The dispenser can include a tube. The tube can include a plug configured to be positioned within a lumen of the tube to close an end of the tube. The tube can include a series of side openings extending proximal to the plug.

In some examples, the apparatus can further include an insulated container configured to receive the container and maintain a temperature below 41° F. The container can be configured to contain the liquid therein. A lower wall of the insulated container can include an opening. The opening of the lower wall can include a retaining mechanism. The retaining mechanism can be configured to retain at least the dispenser.

In some aspects, the apparatus can further include a conductive plate positioned at or near the opening of the lower wall. The conductive plate can be configured to cool the liquid dispensed through the dispenser.

In some examples, the dispenser can include a tube. The tube can include a plug configured to be positioned within an aperture of the dispenser to prevent flow through the aperture of the dispenser. The aperture can include a first portion and a second portion. The first portion can have a first diameter and the second portion can have a second diameter. The first diameter can be smaller than the second diameter. The plug can be configured to be positioned in the first portion of the aperture when the dispenser is in the closed position. The plug can be configured to be positioned in the second portion of the aperture when the dispenser is in the open position.

In yet another aspect, an apparatus for dispensing a liquid can include a dispenser. The dispenser can include a tube with a lumen with an inlet and an outlet. The dispenser can further include a cross lumen intersecting with the lumen of the tube between the inlet and the outlet of the tube. A length of the cross lumen can extend substantially perpendicular to the lumen of the tube. The dispenser can include a valve positioned within the cross lumen. The dispenser can be configured to receive a container in an upside down position, such that an opening of the container is positioned below a remainder of the container. The dispenser can be configured to move between an open position and a closed position. In the open position, the dispenser can be configured to dispense the liquid from the container.

In some examples, the valve can include an enlarged portion configured to block the lumen of the tube and a neck portion configured to allow fluid to flow from the lumen of the tube and around the neck portion. The enlarged portion can be positioned adjacent to the neck portion. The valve can be configured to move laterally between a first position and a second position. In the first position, the enlarged portion can be aligned with the lumen of the tube. In the second position, the neck portion can be aligned with the lumen of the tube to allow fluid from the lumen of the tube and around the neck portion. The valve can include a handle for moving the valve between a first position and a second position. The valve can further include a second enlarged portion. The enlarged portion can be positioned adjacent to the neck portion on a first side. The second enlarged portion can be positioned adjacent to the neck portion on an opposing second side. The valve can be actuated by a motor. The dispenser can further include a spring positioned to bias the valve to a closed position. The dispenser can further include an air docking tube extending substantially perpendicular to a length of the dispenser. The air docking tube can extend substantially perpendicular to a length of the cross lumen. The dispenser can further include an air channel in fluid communication with an aperture of the air docking tube. The dispenser can further include a plenum connected to the aperture of the air docking tube and the air channel. The dispenser can further include a sealing plug. The sealing plug can include an inner protrusion that extends radially inward from an inner wall of the sealing plug. The inner protrusion can act as a check valve for the air channel. The cross lumen can include a first open end to receive the valve and second closed end. The cross lumen can include a first open end and a second open end.

BRIEF DESCRIPTION OF THE DRAWINGS

Various embodiments are depicted in the accompanying drawings for illustrative purposes, and should in no way be interpreted as limiting the scope of the embodiments. Various features of different disclosed embodiments can be combined to form additional embodiments, which are part of this disclosure.

DETAILED DESCRIPTION

Various extraction systems and methods are described below to illustrate various examples that may achieve one or more desired improvements. These examples are only illustrative and not intended in any way to restrict the general disclosure presented and the various aspects and features of this disclosure. The general principles described herein may be applied to embodiments and applications other than those discussed herein without departing from the spirit and scope of the disclosure. Indeed, this disclosure is not limited to the particular embodiments shown, but is instead to be accorded the widest scope consistent with the principles and features that are disclosed or suggested herein.

For example, many of the embodiments are described in the context of dispensing a liquid from a container at room temperature or at temperatures colder than room temperature. However, certain features and aspects of the disclosure may also have utility in dispensing fluid at temperatures above room temperature or from liquid bases at above room temperature. Many of the embodiments described herein involve dispensing liquid, such as milk or a non-dairy liquid. For instance, in some embodiments, the liquid may be milk, cream, almond milk, soy milk, oat milk, coconut milk, cashew milk, other alternative milks, other plant-based liquids, coffee, tea, or hemp extract.

To dispense edible liquids safe for human consumption, the liquid can be stored at safe temperatures to prevent the growth of pathogens and prevent spoilage. In some examples, the liquid is maintained at an ambient temperature, such as not exceeding 120° F. For instance, in certain configurations described herein, the liquid may be maintained between 0° F. and 120° F. In certain embodiments, the temperature of the liquid base may be maintained at refrigerated temperatures, such as between 30° F. and 50° F. and in certain embodiments between 30° F. and 40° F. and in certain embodiments between 30° F. and 41° F. In certain embodiments, the liquid have a temperature not exceeding 41° F.

Figure 1A:
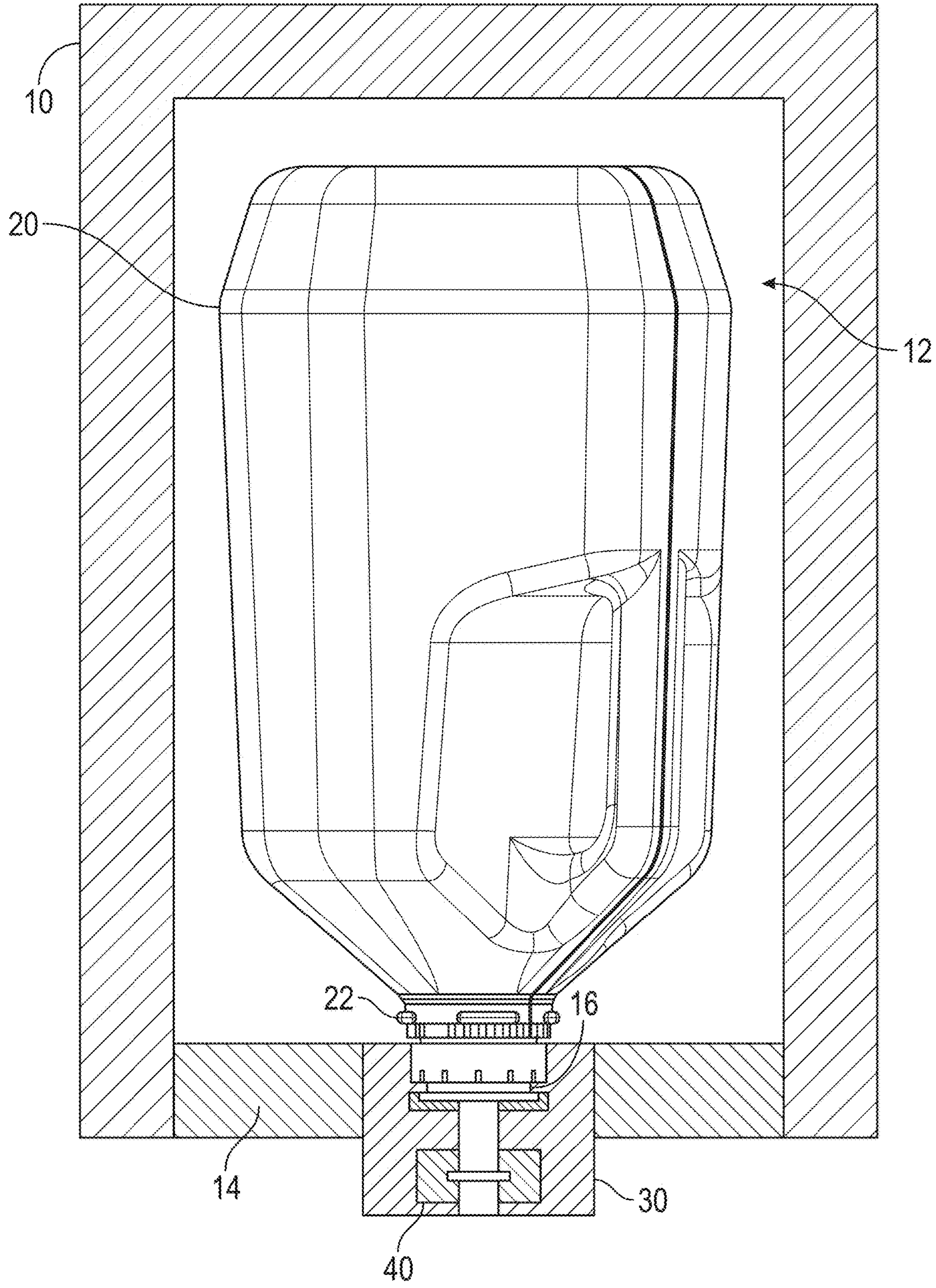
FIG. 1A illustrates a container and schematically illustrates an embodiment of a dispenser and refrigeration system.

FIG. 1A schematically illustrates an embodiment of a dispenser and refrigeration system with a container positioned therein. The system can include a refrigerated or insulated cabinet or compartment 10. The compartment 10 can define a refrigerated cavity 12 to hold or store the container 20 which contains liquid therein. The compartment 10 can be made of a thermally conductive material to maintain the container 20 at a uniform and desired temperature, such as below 41° F. In some examples, the compartment 10 can be made of metal or any other suitable thermally conductive material. The compartment 10 can include a base or lower wall 14. The lower wall 14 can include an opening with a retaining mechanism 16. The opening in the lower wall 14 can be a point of dispensing as it can allow the liquid from the container 20 to be dispensed therethrough. The retaining mechanism 16 in the lower wall can be configured to receive at least a portion of the container 20 or the dispenser 40. The retaining mechanism 16 can be an aperture shaped to define the dispenser 40. The retaining mechanism 16 can align the opening of the lower wall 14 with the opening 22 of the container 20. The retaining mechanism 16 can hold the container 20 in place and in position, such as holding the container 20 upside down or inverted and with the opening 22 of the container 20 aligned with the opening of the lower wall 14. In this manner, the container 20 can be in an inverted position with the opening 22 of the container positioned below the remainder of the container 20. In certain embodiments, the retaining mechanism 15 can include a seal that provides that can seal air within the compartment 10 and, in certain embodiments, also provide a friction fit to aid in retaining the container 20 within the container 10. As will be explained below, in certain embodiments, the retaining mechanism 16 can include a sliding lock mechanism for opening and closing the retaining mechanism 16. In some examples, the container 20 itself can be insulated.

The system can also include a conductive plate 30, which can be actively or passively cooled. The conductive plate 30 can be positioned at or near the opening of the lower wall 14. The conductive plate 30 can be used to further cool the liquid dispensed from the container 20 at the point of dispensing of the system. Additionally, the conductive plate 30 can be used to cool the dispenser 40 itself as liquid is dispensed out of the system.

The dispenser 40 can be configured to move between an open position and a closed position. The dispenser 40 can have an activating mechanism, which can move the dispenser 40 between the open and closed positions.

Figure 1B:
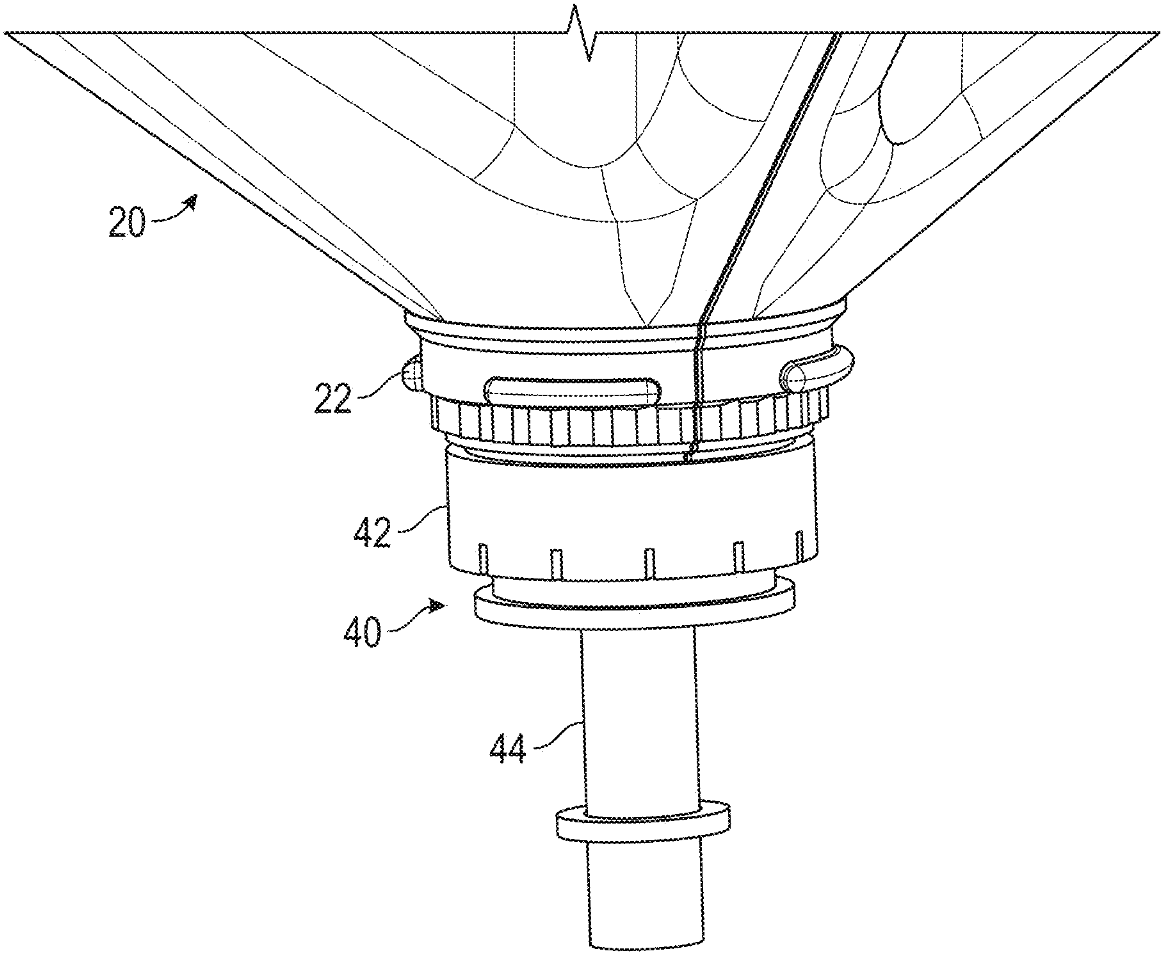
FIG. 1B illustrates the container and dispenser without the refrigeration container of FIG. 1A.
Figure 1C:
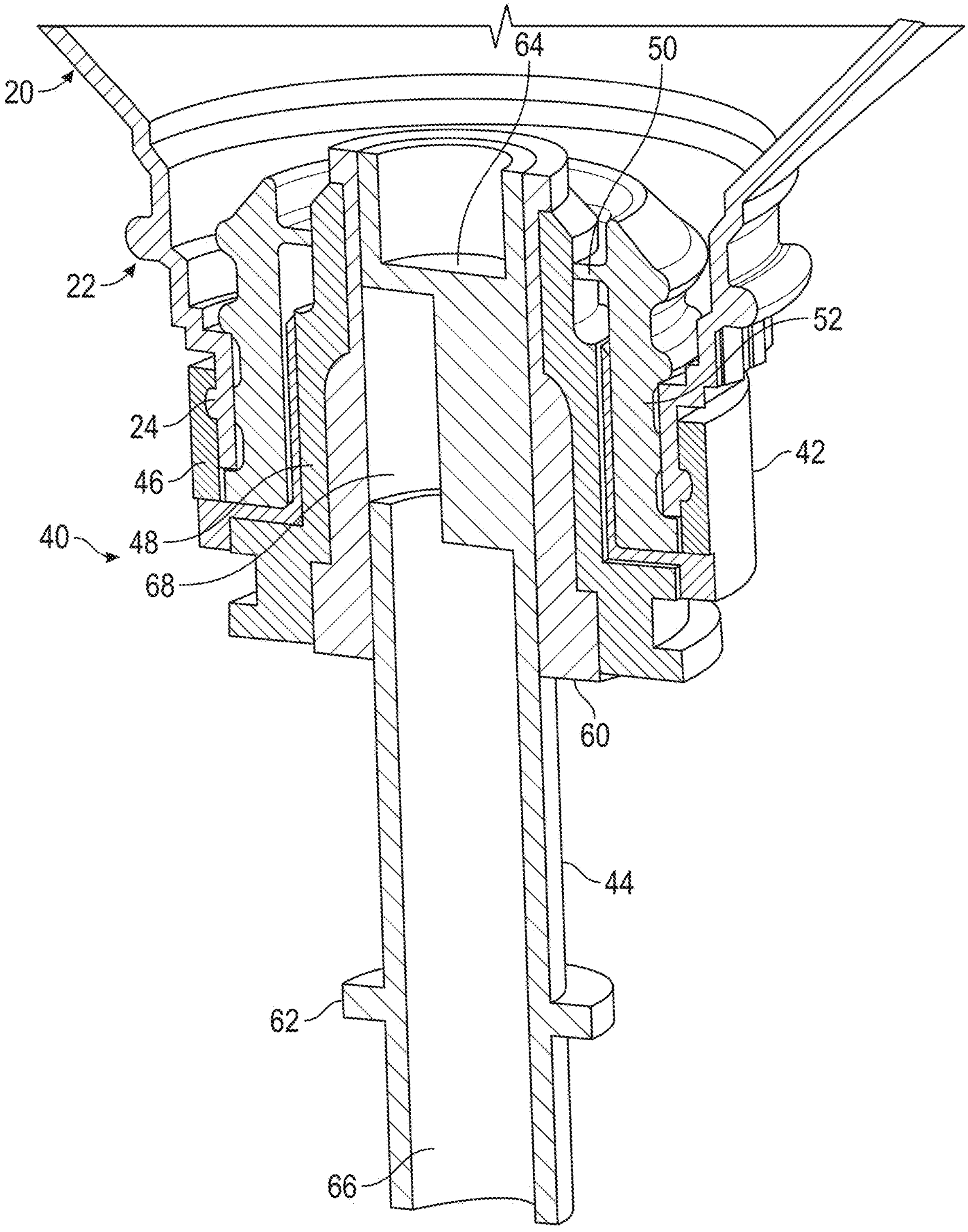
FIG. 1C illustrates a cross-section of the dispenser of FIG. 1B.

FIG. 1B illustrates the container 20 and dispenser 40 without the refrigeration compartment 10 of FIG. 1A. FIG. 1C illustrates a cross-section of the container 30 and dispenser 40 of FIG. 1B. As illustrated, the dispenser 40 can be removably attached to the opening 22 of the container 20. The dispenser 40 can include a cap 42 and a nozzle or tube 44. The cap 42 can be configured to engage with a lip 24 of the opening 22 of the container 20. The cap 42 can screw on or push on to the lip 24 of the opening 22 of the container 20. The cap 42 can have an outer wall 46 and an inner wall 48. The outer wall 46 and the inner wall 48 can define a space therebetween to receive at least the lip 24 of the opening 22. The outer wall 46 and the inner wall 48 can be positioned on opposing sides of the lip of the opening 22. The outer wall 46 can be positioned outside the opening 22 of the container 20, such that the outer wall 46 is positioned around an outer surface of the lip 24 of the opening 22. The inner wall 48 can be positioned within the opening 22 of the container 20, such that the inner wall 48 is positioned around an inner surface of the lip 24 of the opening 22.

The dispenser 40 can further include a check valve seal 50 and a sealing plug 52. In some examples, the check valve seal 50 and the sealing plug 52 can be integral or separate components. The check valve seal 50 and/or the sealing plug 52 can be removable or disassembled from the other components of the dispenser 40, such as the cap 42 and the tube 44. This advantageously allows the check valve seal 50 and/or the sealing plug 52 to be easily disassembled for cleaning. The check valve seal 50 can be configured to let air inside the container 20. The check valve seal 50 can be positioned between the sealing plug 52 and the inner wall 48. The sealing plug 52 can be positioned between the inner wall 48 and the lip 24 of the opening 22 The sealing plug 52 can be a push in seal or an expandable seal. The sealing plug 52 can be configured to prevent liquid from passing between the cap 42 and the lip 24 of the opening 22 and improve sealing of the dispenser 40 to the container 20.

The inner wall 48 of the cap 42 can define an aperture to receive at least the tube 44. The aperture defined by the inner wall 48 can be in fluid communication with the opening 22 of the container 20. In some examples, the inner wall 48 can define an aperture to receive the tube 44 and a seal 60. The seal 60 can also define an aperture therethrough to receive the tube 44 in a sliding manner, such that the tube 44 can slide relative to the seal 60. The aperture of the seal can be in fluid communication with the opening 22 of the container 20. The seal 60 can be positioned between the tube 44 and the inner wall 48 of the cap 42. The seal 60 can prevent liquid from passing between the tube 44 and the inner wall 48 of the cap 42. In some examples, the seal 60 can be integral with the cap 42. In other examples, the seal can be a separate component from the cap 42.

The tube 44 can be configured to be positioned within the opening 22 of the container 20. In some examples, the tube 44 can be positioned centrally within the opening 22 of the container 20. The tube 44 can be held in place with the inner wall 48 of the cap 46 and/or the seal 60. The tube 44 can define a lumen extending from one end of the tube 44 to opposite end of the tube 44. The tube 44 can allow liquid to flow from the container 20, through the lumen of the tube 44, and out through the tube 44 to dispense the liquid when the dispenser is in an open position. The tube 44 can have an open end with a central aperture 66 and a closed end with a stopper 64. The tube 44 can have a second opening 68 positioned near the closed end with the stopper 64. The lumen of the tube 44 can connect a first opening 66 at a first end of the tube 44 and a second opening 68 near the second end of the tube 44. The first opening 66 can be positioned centrally, along the longitudinal axis of the tube 44 and through an end wall of the tube 44. The second opening 68 can be positioned along a side wall of the tube 44 near the second end of the tube 44. The second end of the tube 44 can include a stopper 64 that closes the second end of the tube 44 and prevents liquid from passing therethrough. In other examples, the second end of the tube 44 can be closed with an end wall.

The tube 44 can be moved up and down relative to the cap 42 and the container 20 which can move the dispenser 40 between a closed position and an open position. As illustrated in FIG. 1C, when the tube 44 is moved down into the closed position, the tube 44 is pulled out and externally extends further relative to the cap 42 than in the open position. In the closed position, the side aperture 68 of the tube 44 interfaces with the seal 60, such that the seal 60 covers the side aperture 68. Liquid from the container 20 is unable to reach and enter the side aperture 68. Liquid from the container is also not permitted to pass the stopper 64 at the second end of the tube 44. Thus, liquid cannot pass through the tube 44 and the dispenser is in a closed position.

When the tube 44 is moved up into an open position, the tube 44 is pushed further into an interior of the container 20 and externally extends shorter relative to the cap 42 than the in the closed position. The tube 44 extends within the container 20 such that the side aperture 68 is positioned within the container 20. This exposes the side aperture 68 to the liquid in the container 20 and allows liquid to flow through the side aperture 68, through the lumen, and out of the central aperture 66 at the first end of the tube 44. In the open position, the side aperture 68 and the lumen of the tube 44 can be in fluid communication with an interior of the container 20.

The tube 44 can also include an activating mechanism to move the dispenser 40 between the open and closed positions. The activating mechanism may be a rib 62 that extends from an outer circumference of the tube 44 positioned at the second end of the tube 44. A user can grasp the rib 62 to pull the tube 44 into the closed position. The user can also push the tube 44 into the open position, such as by using the rib 62 or by pushing on the second end of the tube 44.

Figure 2A:
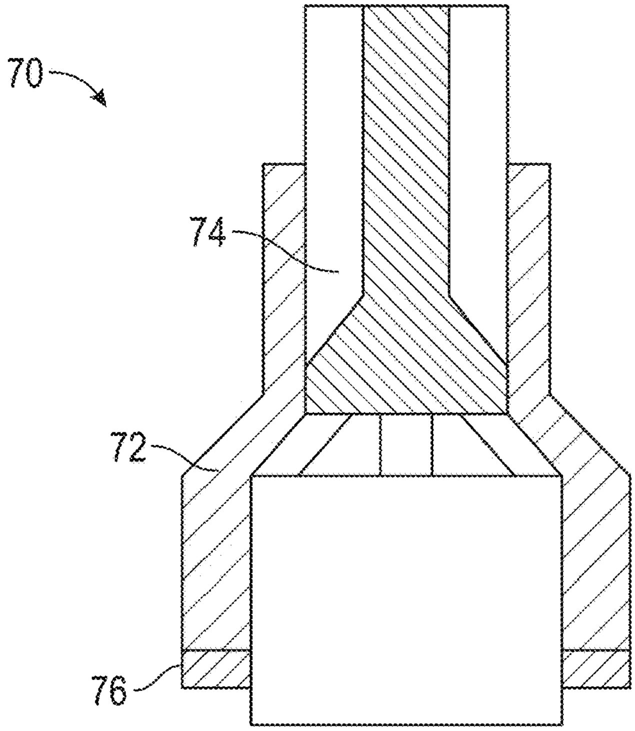
FIG. 2A schematically illustrates another embodiment of a dispenser in a closed position.
Figure 2B:
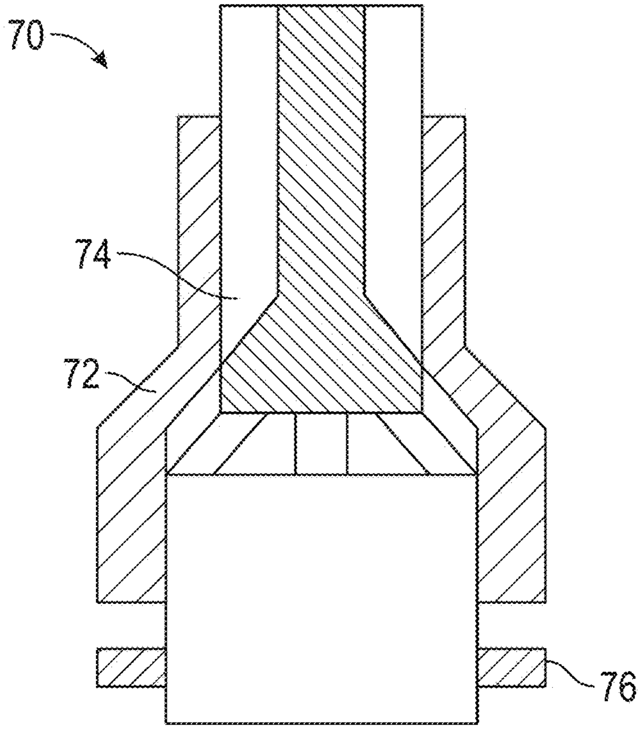
FIG. 2B schematically illustrates a cross-section of the dispenser of FIG. 2A in the closed position.
Figure 2C:
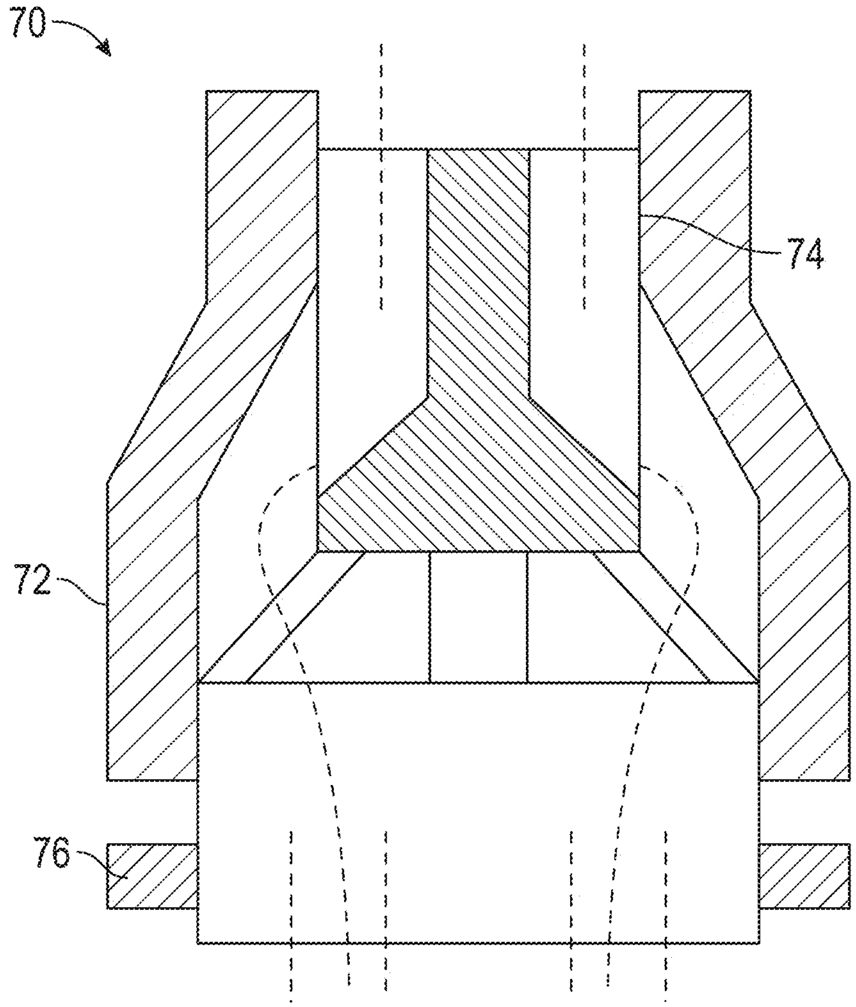
FIG. 2C schematically illustrates the dispenser of FIGS. 2A and 2B in an open position.

In other examples, a dispenser 70 can be provided with a reverse operation than the dispenser 40 described in FIGS. 1B-1C, such that the dispenser 70 can be pulled down to an open position and pushed up into a closed position. FIG. 2A illustrates another embodiment of a dispenser 70 in a closed position. FIG. 2B illustrates a cross-section of the dispenser 70 of FIG. 2A in the closed position. FIG. 2C illustrates the dispenser 70 of FIGS. 2A and 2B in an open position. The dispenser 70 can include a seal 72 and a tube 74. The seal 72 can be have a complementary shape to the tube 74, such that the seal 72 is shaped to receive the tube 74. As shown in FIGS. 2A and 2B, when the tube 74 is pushed up, the tube 74 fits within the seal 72, allowing the seal 72 to interface or snugly fit with the outer surface of the tube 74 such that the seal 72 surrounds the outer surface of the tube 76. Thus, in the closed position, liquid is prevented from flowing between the tube 74 and the seal 74. The tube can include a stopper 76 at one end of the tube 74. The stopper 76 can extend from the outer circumference of the tube 74. The stopper 76 at the end of the tube 74 is positioned against an end of the seal 72, which can further prevent any liquid from passing between the preventing the tube 72 and the seal 74. Additionally, the stopper 76 can prevent the tube 74 from traveling up further, which can prevent damage to the seal 74.

As shown in FIG. 2C, the tube 74 is pulled down, such that the seal 72 no longer snugly fits with the tube 74 in this position. In this position, space is formed between the tube 72 and the seal 74. In this position, liquid is allowed to flow between the tube 72 and the seal 74. The stopper 76 at the end of the tube 74 is positioned away from the end of the seal 72, allowing the liquid to flow between the tube 74 and the seal. The tube 74 also includes one or more openings that allow a flow of liquid to pass through and inside the tube 74.

Figure 3A:
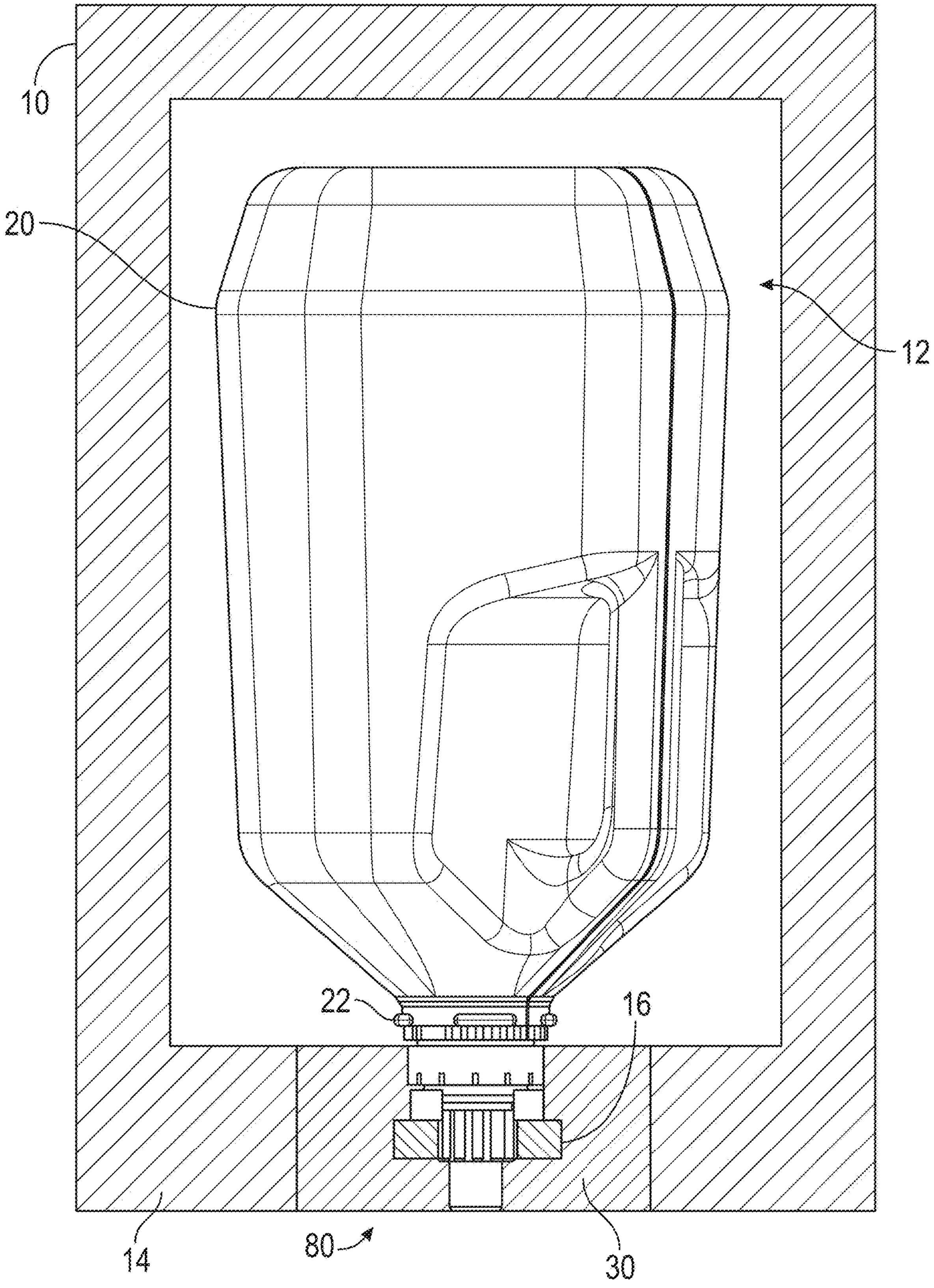
FIG. 3A illustrates a container and schematically illustrates another embodiment of a dispenser and refrigeration system.

FIG. 3A illustrates an embodiment of a dispenser and refrigeration system with a container positioned therein. FIG. 3A can be similar to the embodiment illustrated in FIG. 1A with another embodiment of a dispenser 80. Similarly, the dispenser 80 can be configured to move between an open position and a closed position. The dispenser 80 can have an activating mechanism, which can move the dispenser 80 between the open and closed positions.

Figure 3B:
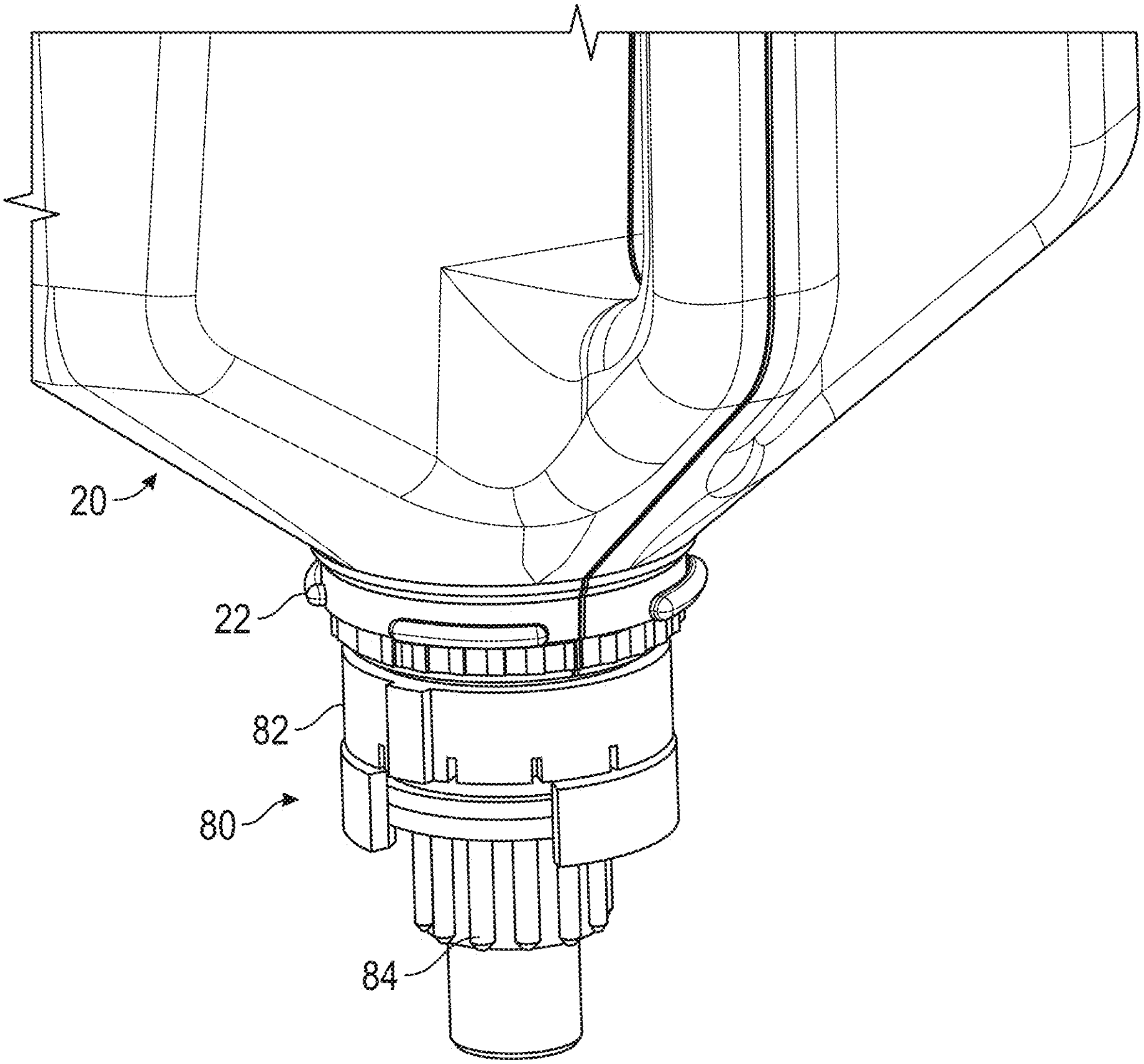
FIG. 3B illustrates the container and dispenser without the refrigeration container of FIG. 3A.
Figure 3C:
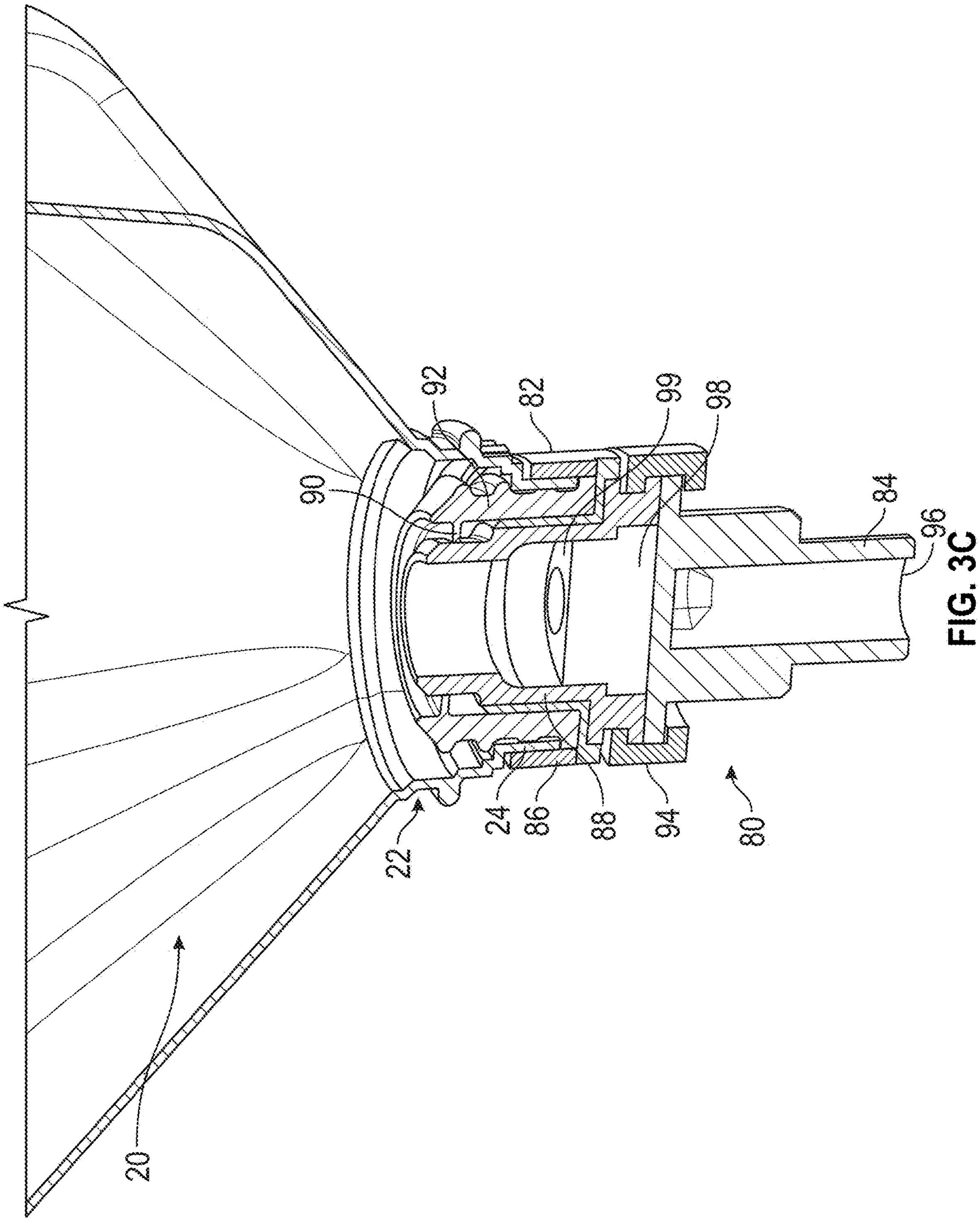
FIG. 3C illustrates a cross-section of the dispenser of FIG. 3B.

FIG. 3B illustrates the dispenser 80 without the refrigeration container of FIG. 3A. FIG. 3C illustrates a cross-section of the dispenser 80 of FIG. 3B. As illustrated, the dispenser 80 can be removably attached to the opening 22 of the container 20. The dispenser 80 can include a cap 82 and a nozzle or tube 84. The cap 82 can be configured to engage with a lip 24 of the opening 22 of the container 20. The cap 82 can screw on or push on to the lip 24 of the opening 22 of the container 20. The cap 82 can have an outer wall 86 and an inner wall 88. The outer wall 86 and the inner wall 88 can define a space therebetween to receive at least the lip 24 of the opening 22. The outer wall 86 and the inner wall 88 can be positioned on opposing sides of the lip 24 of the opening 22. The outer wall 86 can be positioned outside the opening 22 of the container 20, such that the outer wall 86 is positioned around an outer surface of the lip 24 of the opening 22. The inner wall 88 can be positioned within the opening 22 of the container 20, such that the inner wall 88 is positioned around an inner surface of the lip 24 of the opening 22.

The dispenser 80 can further include a check valve seal 90 and a sealing plug 92. In some examples, the check valve seal 90 and the sealing plug 92 can be integral or separate components. The check valve seal 90 and/or the sealing plug 92 can be removable or disassembled from the other components of the dispenser 80, such as the cap 82 and the tube 84. This advantageously allows the check valve seal 90 and/or the sealing plug 92 to be easily disassembled for cleaning. The check valve seal 90 can be configured to let air inside the container 20. The check valve seal 90 can be positioned between the sealing plug 92 and the inner wall 88. The sealing plug 92 can be positioned between the inner wall 88 and the lip 24 of the opening 22. The sealing plug 92 can be a push in seal or an expandable seal. The sealing plug 92 can be configured to prevent liquid from passing between the cap 82 and the lip 24 of the opening 22. The cap 82 can push on or secure the sealing plug 92 to improve the sealing of the container 20.

The inner wall 88 of the cap 82 can define an aperture to receive a seal 98. In some examples, the seal 98 and the cap 82 can be integral or separate components. The aperture defined by the inner wall 88 can be in fluid communication with the opening 22 of the container 20.

The tube 84 can include an inner wall that can define a lumen 96 extending from one end of the tube 84 to opposite end of the tube 84. The lumen 96 of the tube 84 can be in fluid communication with the aperture defined by the inner wall 88 of the cap 82 and therefore also in fluid communication with the opening 22 of the container 20. The tube 84 can allow liquid to flow from the container 20, through the lumen 96 of the tube 84, and out through the tube 84 to dispense the liquid when the dispenser 80 is in an open position. The tube 84 can have an end surface. The end surface of the tube 84 can be positioned adjacent to a face of the seal 98 and an end of the cap 82. The seal 98 can include an aperture 99 that extends through the length of the seal 98. The aperture 99 of the seal 98 can be positioned off center through the seal 98. Similarly, the lumen 96 defined by the inner wall of the tube 84 can also be positioned off center through the tube 84. The end surface of the tube 84 can interface with the seal 98 to form a face seal with the seal 98. The cap 82 and the end surface of the tube 84 can be held together with a clip 94 to keep pressure of the tube 84 against the cap 82 and the seal 98 positioned therein. The clip 94 can keep pressure on the face seal formed with the seal 98 and the end surface of the tube 84.

Figure 3D:
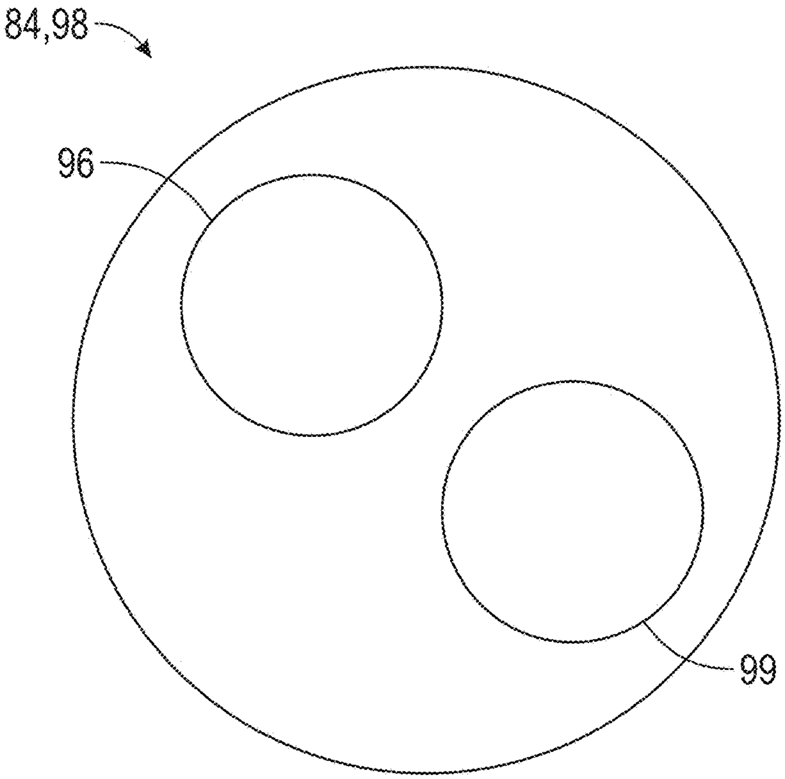
FIG. 3D illustrates a top view of the seal and the dispenser of FIG. 3C when the dispenser is in a closed position.
Figure 3E:
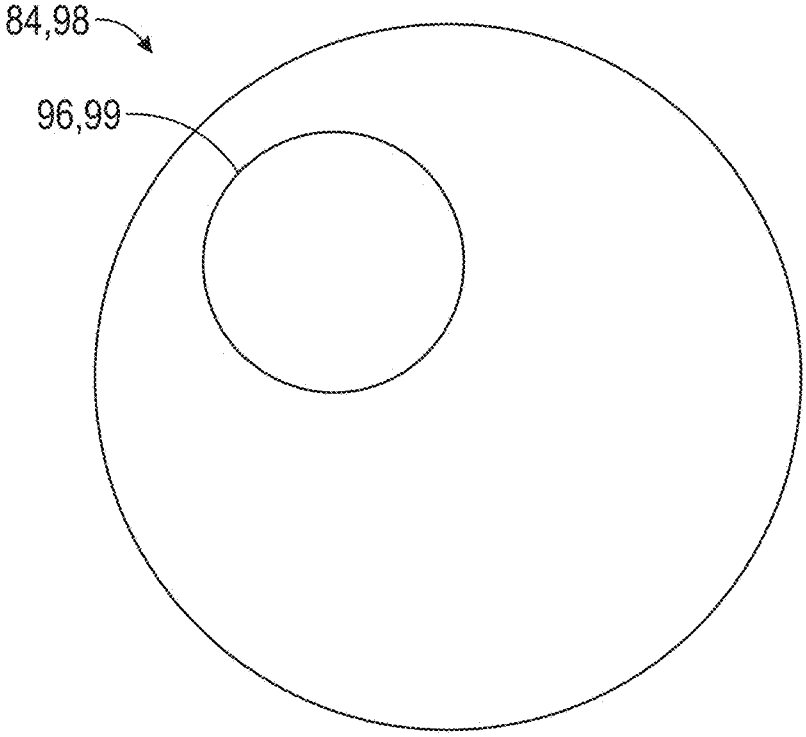
FIG. 3E illustrates a top view of the seal and the dispenser of FIG. 3C when the dispenser is in an open position.

FIGS. 3D and 3E show a top view of the tube 84 and the seal 98. When the dispenser 80 is in the closed position, the aperture 99 of the seal 98 is not aligned or does not overlap with the lumen 96 of the tube 84, such as shown in FIG. 3D. In this manner, liquid cannot travel from the container 20 to the tube 84 when in the closed position. When in the closed position, the end surface of the tube 84 can form a face seal against a surface of the seal 98. When the dispenser 80 is in the open position, the aperture 99 of the seal 98 can be aligned with lumen 96 of the tube 84, such as shown in FIG. 3E. In this manner, liquid can travel from the container 20 to the tube 84 when in the open position. The tube 84 can be rotated relative to at least the seal 98 into the open and closed positions. The rotation of the tube 84 relative to the seal 98 can bring the aperture 99 of the seal 98 in alignment or out of alignment with the lumen 96 of the tube 84. The tube 84 can be rotated relative to the cap 82 and the container 20 which can move the dispenser 80 between a closed position and an open position.

The tube 84 can also include an activating mechanism to move the dispenser 80 between the open and closed positions. The activating mechanism may be a rib or surface on an outer surface of the tube 84. A user can grasp the surface to rotate the tube 84 into the open or closed position.

Figure 4A:
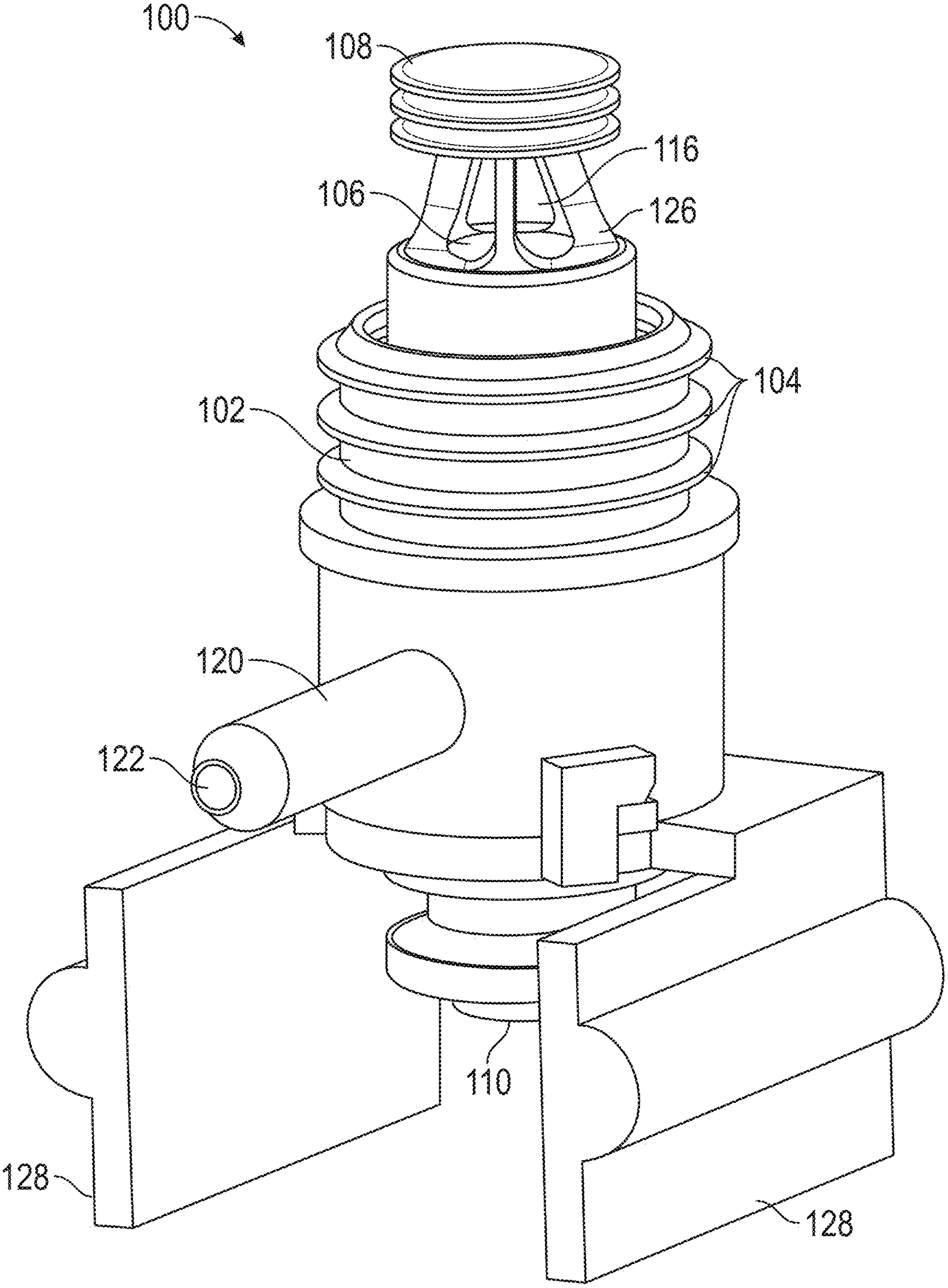
FIG. 4A illustrates another embodiment of a dispenser in an open position.
Figure 4B:
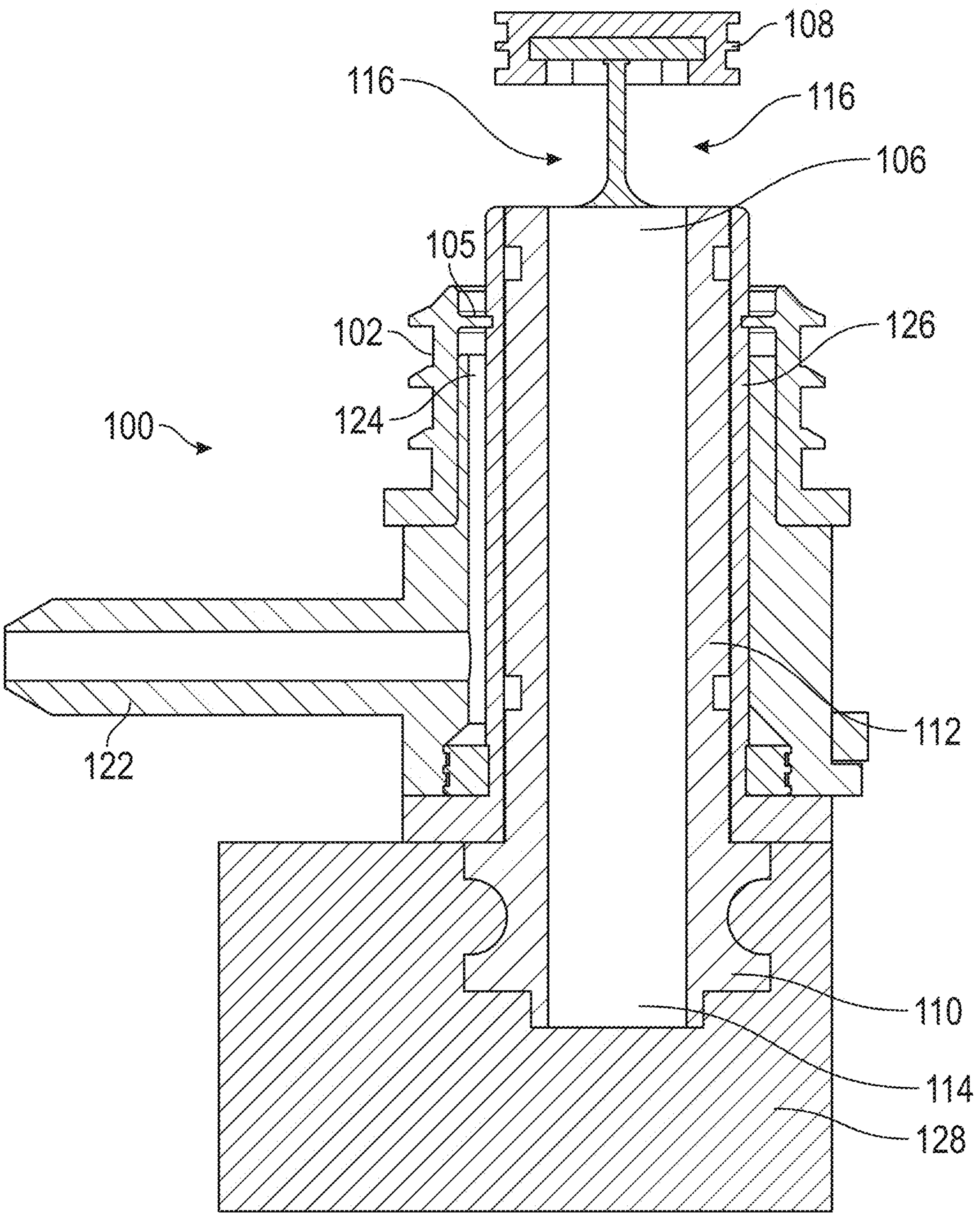
FIG. 4B illustrates a cross-section of the dispenser of FIG. 4A in an open position.

FIG. 4A illustrates another embodiment of a dispenser in an open position. FIG. 4B illustrates a cross-section of the dispenser of FIG. 4A in an open position. FIG. 4B illustrates a cross-section of the dispenser of FIGS. 4A-4B in an open position.

The dispenser 100 can include a plurality of stands or supports 128. For example, the dispenser 100 can include two stands or supports 128 positioned on opposing sides of the dispenser 100. The supports 128 can be positioned at one end from the dispenser 100 and can be configured to support the weight of the container and the contents therein, as well as the dispenser 100 itself. The container can be positioned upside down with the opening facing downwards. The dispenser 100 is configured to be positioned within and seal the opening of the container. The dispenser 100 can then be opened to dispense liquid from the container and through the dispenser 100.

The dispenser 100 can be removably inserted into an opening of the container. The dispenser 100 can include a sealing plug 102. At least a portion of the sealing plug 102 can be configured to engage with the inner surface of the opening. The sealing plug 102 can have a series of ribs or circumferential projections 104 that can be flexible and compress to be inserted into the opening of the container and expand to push against the inner surface of the opening of the container. In this manner, the sealing plug 102 can removably seal the opening of the container. The sealing plug 102 can be configured to prevent liquid from passing between the sealing plug 102 and the opening of the container.

The dispenser 100 can also include a tube 112. An inner wall of the sealing plug 102 can define an aperture 126 to receive at least a tube 112. An aperture 126 of the dispenser 100 can be configured to receive at least the tube 112. The tube 112 can define a lumen extending from one end of the tube 112 to opposite end of the tube 112. The tube 112 can have two ends, one end with a nozzle 110 and an opposing second end with a plug 108. The first end of the tube 112 can be an open end with a central aperture. The first end of the tube 112 can also have a nozzle 110. The second end of the tube 112 can have a plug 108. The plug 108 can be configured to close flow through the tube 112 by being positioned within and sealing the inner wall defining the aperture 126 of the dispenser 100. The second end of the tube 112 can have a series of struts extending from the plug 108. The struts can define a series of side openings 116. For example, the tube 112 can include three side openings 116. The series of side openings 116 can extend proximal to the end of the tube 112 and the plug 108 at the end of the tube 112. The lumen of the tube 112 can connect a first opening 114 at a first end of the tube 112 and a series of side openings 116 near the second end of the tube 44. The first opening 114 can be positioned centrally, along the longitudinal axis of the tube 112 and through an end wall of the tube 112. The series of openings 116 can be positioned through side walls of the tube 112 near the second end of the tube 112. The second end of the tube 112 can include a plug 108 that closes flow through the tube 112 and prevents liquid from passing therethrough when the dispenser 100 is in the closed position.

The second end of the tube 112 with the plug 108 can extend from an end of the dispenser 100 and can be positioned within the opening and into the interior of the container 20. The tube 112 can allow liquid to flow from the container, through the second end of the tube 112, through the lumen of the tube 112, and out through the nozzle 110 to dispense the liquid when the dispenser 100 is in an open position. In some examples, the tube 112 can be positioned centrally within the opening of the container. The nozzle 110 can remain outside of the container and can be configured to dispense the liquid when the dispenser 100 is in an open position. The nozzle 110 can act as an activating mechanism for the dispenser 100, such that the nozzle 110 can be pulled or pushed to move the dispenser 100 between a closed position and an open position.

Figure 4C:
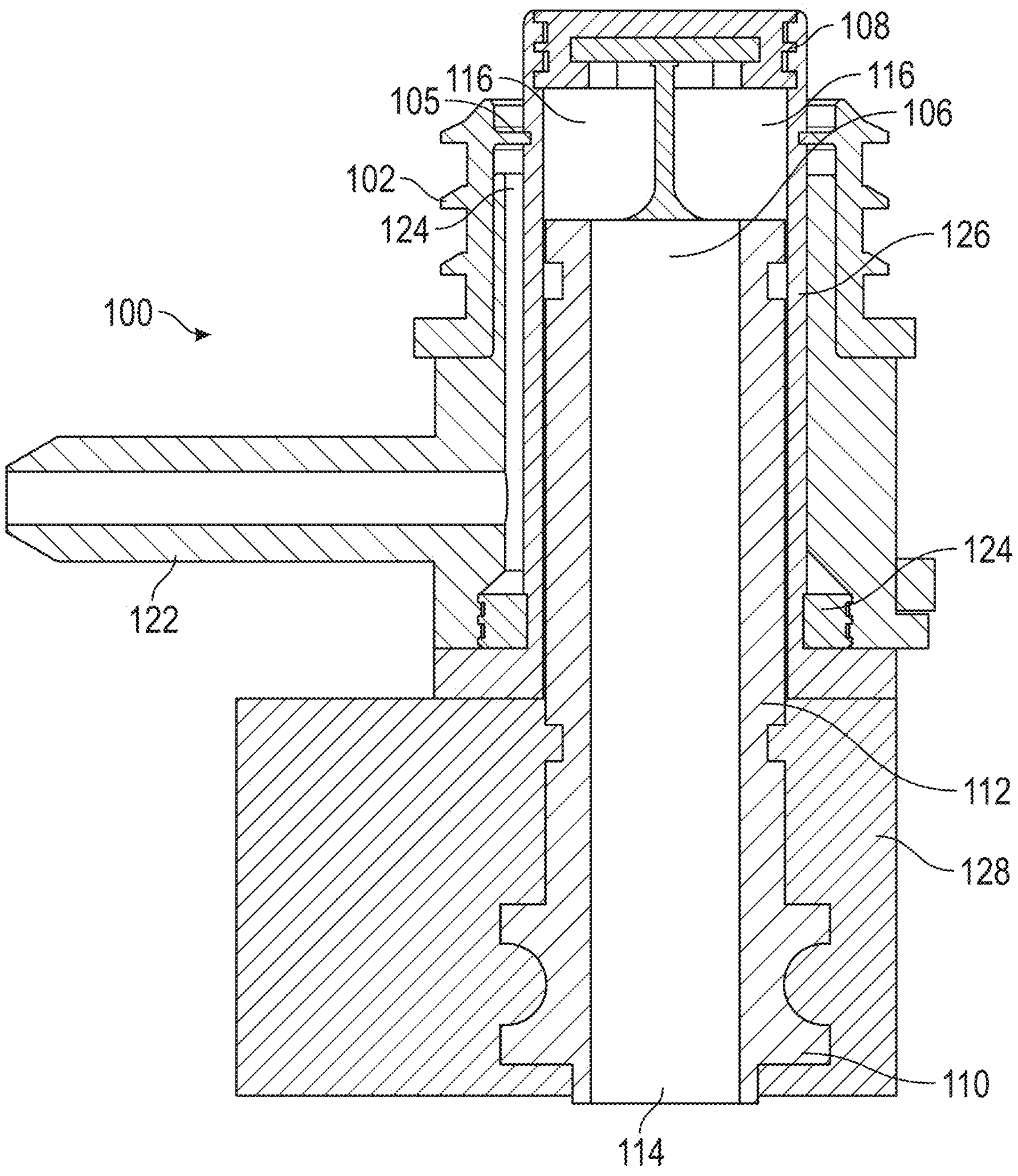
FIG. 4C illustrates a cross-section of the dispenser of FIGS. 4A-4B in an open position.

The tube 112 can be moved up and down relative to the remainder of the dispenser 100 and the container, which can move the dispenser 100 between a closed position and an open position. As illustrated in FIG. 4C, when the tube 112 is moved down into the closed position, the tube 112 is pulled out at the first end with the nozzle 110 and externally extends from the container, further relative to the remainder of the dispenser 100 in the open position. Additionally, in the closed position, the side openings 116 of the tube 112 interfaces with the side walls of the aperture 126, such that the side walls of the aperture 126 covers the side openings 116. In the closed position, the plug 108 can close an end of the aperture 126. Liquid from the container 20 is unable to reach and enter the side openings 116. Liquid from the container is also not permitted to pass the plug 108 at the second end of the tube 112. Thus, liquid cannot pass through the tube 112 and the dispenser is in a closed position.

When the tube 112 is moved up into an open position, such as shown in FIGS. 4A and 4B, the second end of the tube 112 is pushed further into an interior of the container and externally extends shorter relative to the remainder of the dispenser 100 than the in the closed position. The tube 112 extends within the container such that the side openings 116 is positioned within the container. This exposes the side openings 116 to the liquid in the container and allows liquid to flow through the side openings 116, through the aperture 106 at the second end of the tube 112, through the lumen, and out of the central aperture at the first end of the tube 112. In the open position, the side openings 116 and the lumen of the tube 112 can be in fluid communication with an interior of the container.

The tube 112 can also include an activating mechanism to move the dispenser 100 between the open and closed positions. The activating mechanism may the nozzle 110 that includes one or more protrusions or ridges that extends from an outer circumference of the tube 112 positioned at the end of the tube 112. A user can grasp the protrusions on the nozzle 110 to pull the tube 112 into the closed position. The user can also push the tube 112 into the open position, such as by using the protrusions of the nozzle 110 or by pushing on the second end of the tube 112.

The dispenser 100 can also include an air docking tube 122. The dispenser 100 can include one or more air channels 124. As illustrated in FIG. 1B, the dispenser 100 can include at least one air channel 124. The air channel 124 can be positioned parallel to the length of the tube 112. The air docking tube 122 can extend substantially perpendicular or transverse to the length of the dispenser 100 and/or the length of the tube 112. The air docking tube 122 can be configured to be positioned outside of the container during use. The air docking tube 122 can include an aperture that allows air to flow from outside of the container and from outside of the dispenser 100, through the air channel 124, through the aperture of the air docking tube 122, and into the container. As illustrated, the aperture of the air docking tube 122 can be connected to and in fluid communication with the air channel 124. The air channel 124 can be covered with an inner protrusion 105 of the sealing plug 102. The inner protrusion 105 of the sealing plug 102 can extend radially inward from the inner surface of the wall of the sealing plug 102. The inner protrusion 105 can act as a check valve for air traveling through the air channel 124 and into the interior of the container. This can allow the check valve to open when air flows through the air channel 124, but each remain closed and prevent liquid from flowing through when air does not flow through the air channel 366.

Figure 5B:
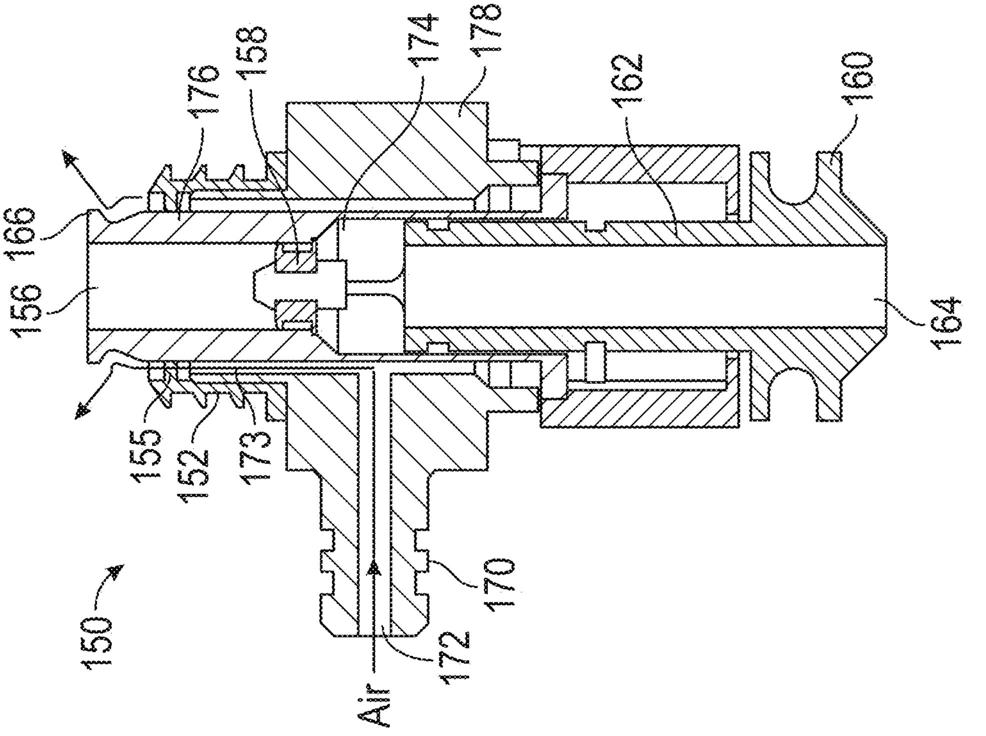
FIG. 5B illustrates a cross-section of the dispenser of FIG. 5A in the closed position.
Figure 5A:
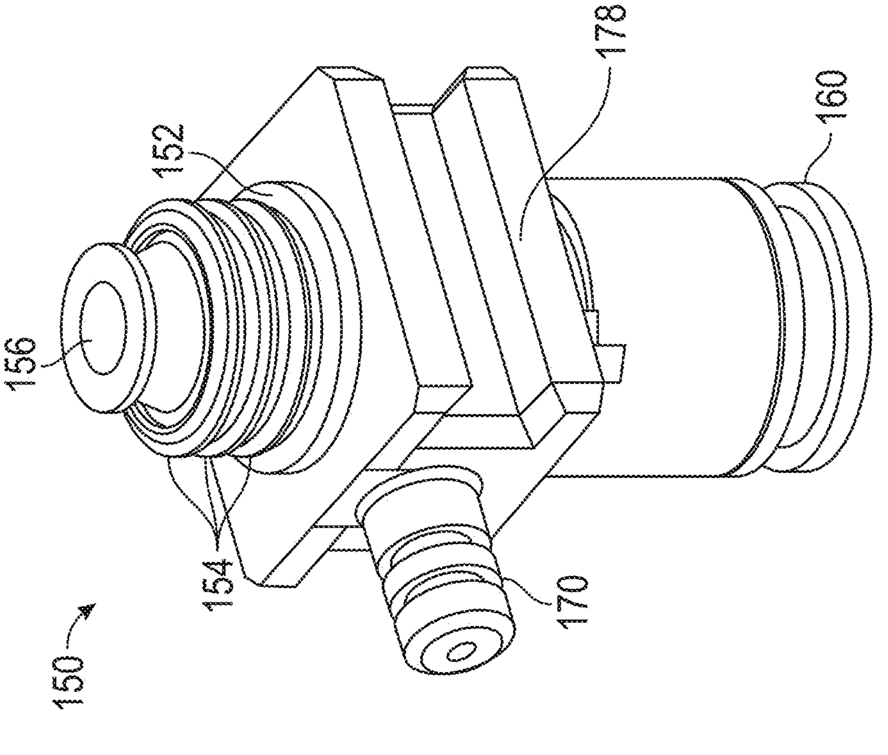
FIG. 5A illustrates another embodiment of a dispenser in a closed position.
Figure 5C:
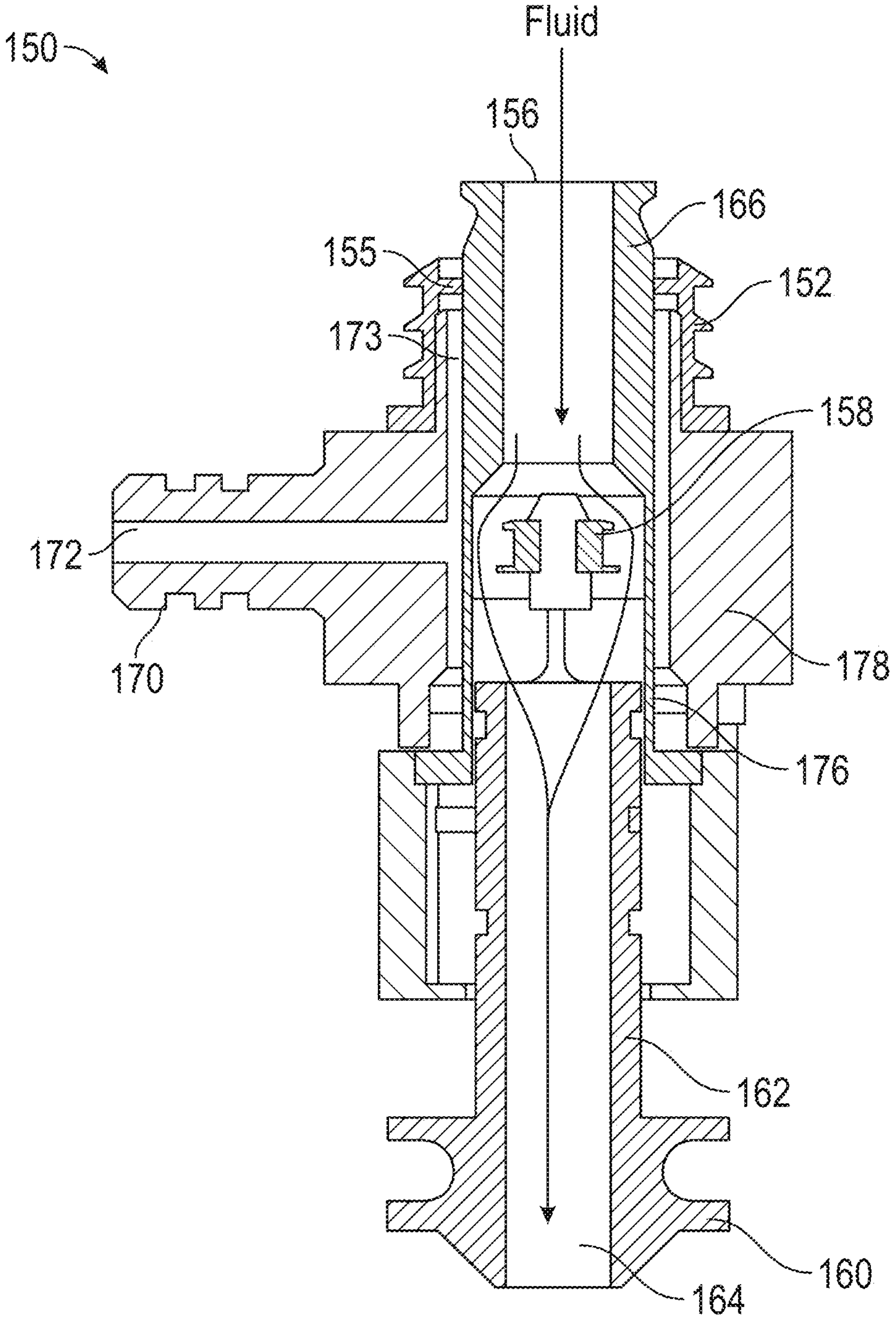
FIG. 5C illustrates a cross-section of the dispenser of FIGS. 5A-5B in an open position.

FIG. 5A illustrates another embodiment of a dispenser in a closed position. FIG. 5B illustrates a cross-section of the dispenser of FIG. 5A in the closed position. FIG. 5C illustrates a cross-section of the dispenser of FIGS. 5A-5B in an open position.

The dispenser 150 can include a plurality of supports 178. For example, the dispenser 150 can include two supports 178 positioned on opposing sides of the dispenser 150. The supports 128 can be configured to engage with another component, such as a clamp or stand, which can engage the supports 128 and support the weight of the container and the contents therein, as well as the dispenser 150 itself. The container can be positioned upside down with the opening facing downwards. The dispenser 150 is configured to be positioned within and seal the opening of the container. The dispenser 150 can then be opened to dispense liquid from the container and through the dispenser 150.

The dispenser 150 can be removably inserted into an opening of the container. The dispenser 150 can include a sealing plug 152. At least a portion of the sealing plug 152 can be configured to engage with the inner surface of the opening of the container. The sealing plug 152 can have a series of ribs or circumferential projections 154 that can be flexible and compress to be inserted into the opening of the container and expand to push against the inner surface of the opening of the container. In this manner, the sealing plug 152 can removably seal the opening of the container. The sealing plug 152 can be configured to prevent liquid from passing between the sealing plug 152 and the opening of the container.

The dispenser 150 can also include a tube 162 that can slide relative to the dispenser 150. An inner wall of the sealing plug 152 can define an aperture 176 to receive at least a portion of the tube 162. A first portion 156 of the aperture 176 can be an open end that is configured to be in fluid communication with the interior of the container. Liquid from the interior of the container can flow through the first portion 156 of the aperture 176. A second portion 174 of the aperture 176 can be configured to receive at least a portion of the tube 162. As shown in FIG. 5B, the first portion 156 of the aperture 176 can be positioned above the second portion 174 of the aperture 176. The aperture 176 can have a first portion 156 with a first diameter and a second portion 174 with a second diameter along the length of the aperture 176. The first diameter of the first portion 156 can be larger than the second diameter of the second portion 174 that is positioned lower than the first diameter.

The tube 162 can define a lumen extending from one end of the tube 162 to opposite end of the tube 162. The tube 162 can have two ends, one end with a nozzle 160 and an opposing second end with a plug 158. The first end of the tube 162 can be an open end with a central aperture 164. The first end of the tube 162 can also have a nozzle 160. The nozzle 160 can remain outside of the container and can be configured to dispense the liquid when the dispenser 150 is in an open position. The nozzle 160 can act as an activating mechanism for the dispenser 150, such that the nozzle 160 can be pulled or pushed to move the dispenser 150 between a closed position and an open position.

The second end of the tube 162 can include a plug 158. The plug 158 can be a radial and face seal to stop the flow of liquid when the dispenser is in the closed position. The plug 158 can attach to the second end of the tube 162 via a series of one or more struts. The plug 158 can be configured to prevent flow of liquid from entering the tube 162. The change in diameter of the aperture 176 allows the position of the plug 158 in the aperture 176 to control flow through the dispenser 150. When the tube 162 is positioned higher, the plug 158 can be positioned higher within the dispenser 150. The plug 158 can be positioned within the first portion 156, thus sealing the inner wall defining the first portion 156 of the aperture 176. The plug 158 can have a diameter that matches the diameter of the first portion 156. When the first portion 156 is sealed with the plug 158, the flow of liquid is prevented from flowing through the aperture 176 when the dispenser 150 is in the closed position.

The tube 162 can be moved up and down relative to the remainder of the dispenser 150 and the container, which can move the dispenser 150 between a closed position and an open position. As illustrated in FIGS. 5A and 5B, when the tube 162 is moved up into the closed position, the tube 162 externally extends shorter relative to the remainder of the dispenser 100 than the in the open position. Additionally, in the closed position, the plug 158 of the tube 162 interfaces with the side walls of the first portion 156 of the aperture 176, such that the liquid is prevented from reaching the lumen of the tube 162. Thus, in the closed position, liquid from the container 20 is unable to reach and enter the lumen of the tube 162. Liquid from the container is also not permitted to pass the plug 108 at the second end of the tube 44. Thus, liquid cannot pass through the tube 162 and the dispenser 150 is in a closed position.

As shown in FIG. 5C, when the tube 162 is positioned higher within the dispenser 150, the plug 158 can be positioned higher within the dispenser 150. The plug 158 can be positioned within the second portion 156. The plug 158 can have a smaller diameter than the diameter of the second portion 156. The plug 158 positioned in the second portion allows liquid to flow from the interior of the container, through the first portion 156 of the aperture 176, the second portion 174 of the aperture 176 around the plug 158, into the lumen of the tube 162 and out the central aperture 164 of the nozzle for dispensing when the dispenser 150 is in the open position.

When the tube 162 is moved down into an open position, such as shown in FIG. 5C, the tube 162 is pulled out at the first end with the nozzle 160 and externally extends from the container, further relative to the remainder of the dispenser 150 than in the open position. The tube 162 extends within the aperture 176 such that the plug 158 is positioned within the second portion 174 of the aperture 176. This allows liquid to flow from the container, into the first portion 156 of the aperture 176, the second portion 174 of the aperture 176, around the plug 158, through the lumen of the tube 162, and out the central aperture 164 at the end of the tube 162. In the open position, the lumen of the tube 162 can be in fluid communication with an interior of the container.

The tube 162 can also include an activating mechanism to move the dispenser 100 between the open and closed positions. The activating mechanism may be the nozzle 160 that includes one or more protrusions or ridges that extends from an outer circumference of the tube 162 positioned at the end of the tube 162. A user can grasp the protrusions on the nozzle 160 to pull the tube 162 into the closed position. The user can also push the tube 162 into the open position, such as by using the protrusions of the nozzle 160 or by pushing on the second end of the tube 162.

The dispenser 150 can also include an air docking tube 170. The air docking tube 170 can extend substantially perpendicular or transverse to the length of the dispenser 150 and/or the length of the tube 162. The air docking tube 170 can be configured to be positioned outside of the container during use. As with the embodiment of FIG. 1B, the dispenser 150 can include an air channel 173 and the sealing plug 152 can include an inner protrusion 155 that acts as a check valve. The air docking tube 170 can include an aperture 172 that allows air to flow from outside of the container and from outside of the dispenser 150, through the aperture of the air docking tube 170, through the air channel 173, and into the container. The dispenser 150 can also include an air curtain deflector 166. The air curtain deflector 166 can be an angled protrusion that extends around the outer perimeter of the tube 162 at one end. The air curtain deflector 166 can redirect the air flowing through the air channel 173. This allows air to flow into the container while being redirected from the flow of liquid.

Figure 6A:
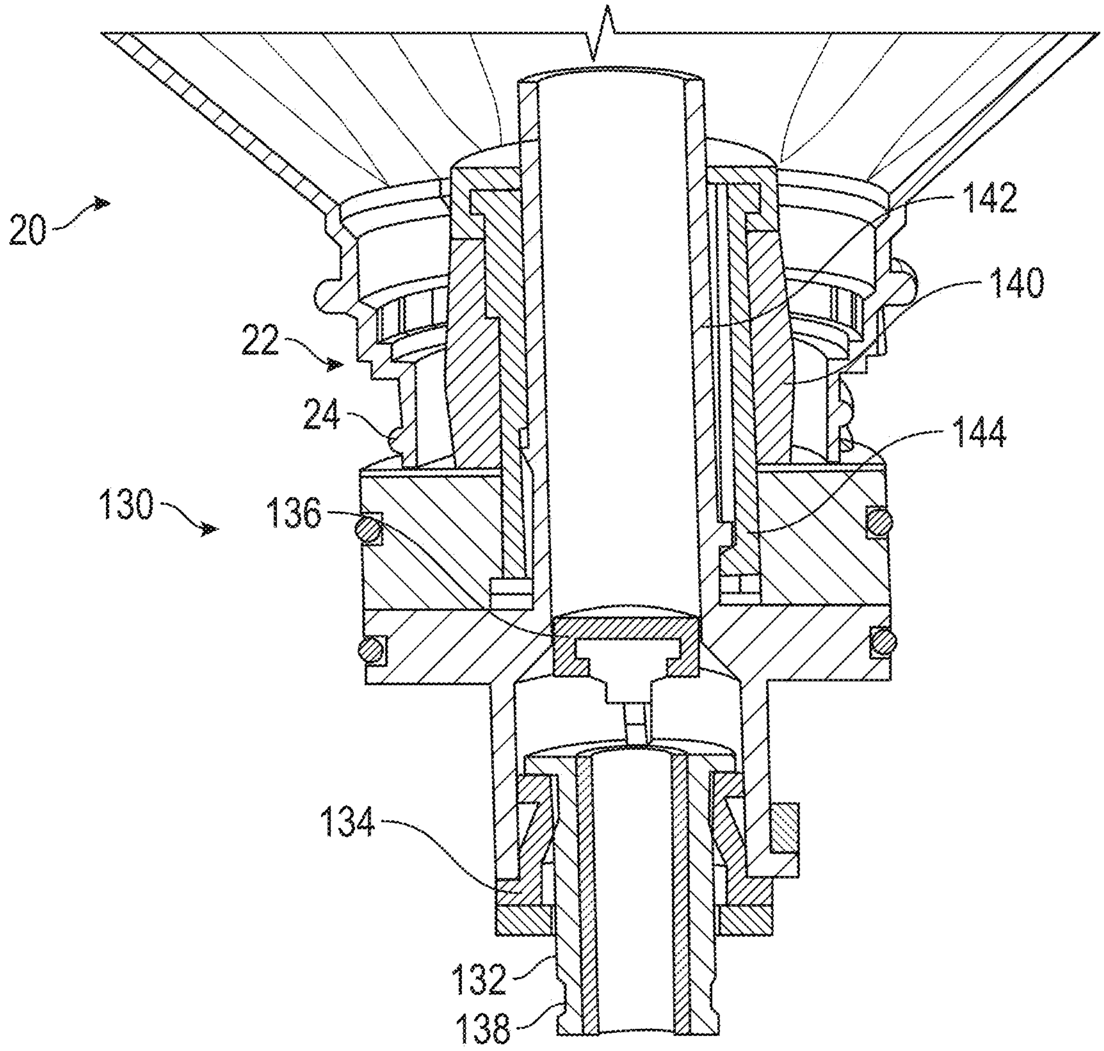
FIG. 6A illustrates a cross-section of another embodiment of a dispenser in a closed position.
Figure 6B:
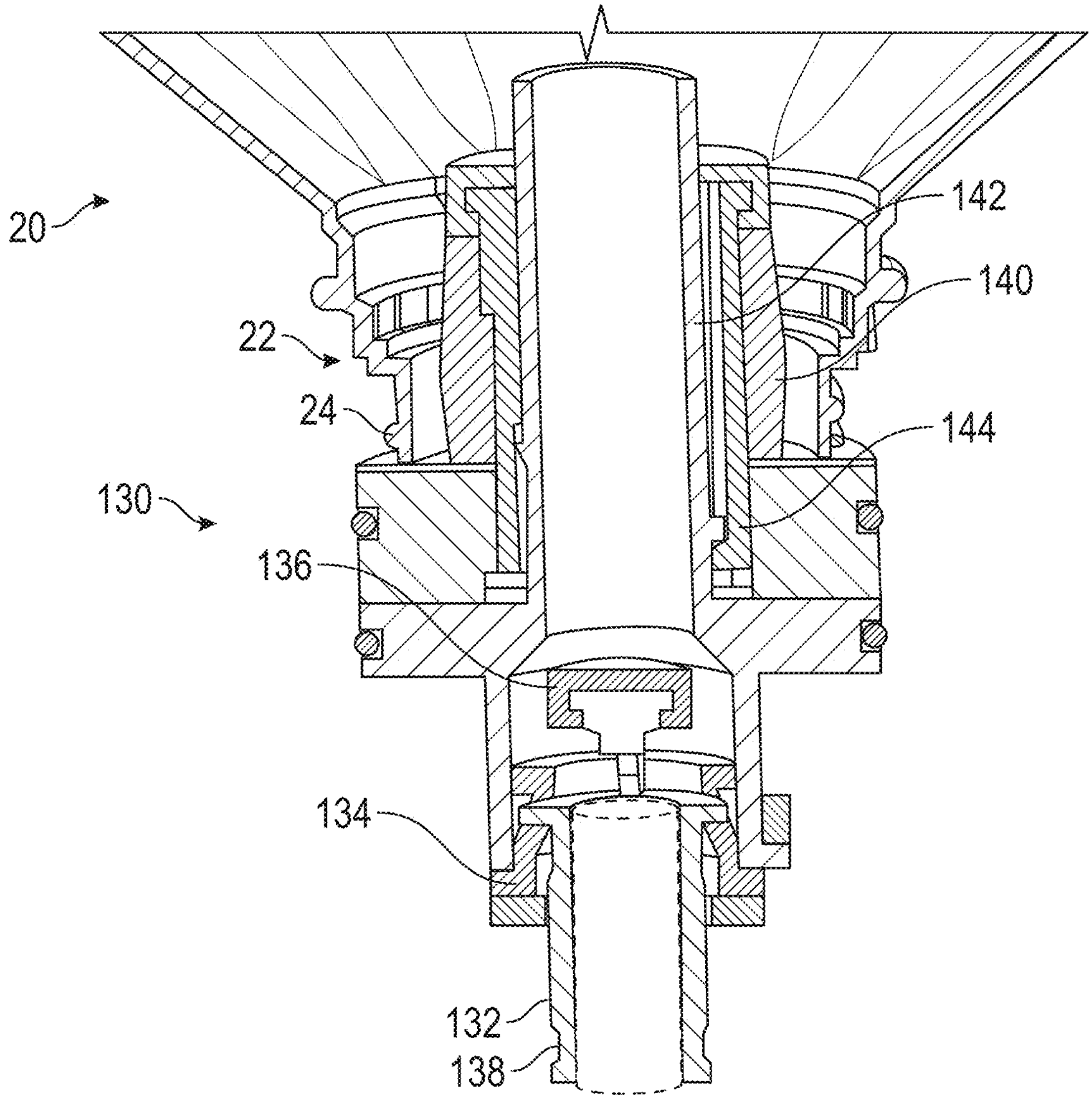
FIG. 6B illustrates a cross-section of another embodiment of the dispenser of FIG. 6A in an open position.

FIG. 6A illustrates a cross-section of another embodiment of a dispenser 130 in a closed position. FIG. 6B illustrates a cross-section of another embodiment of the dispenser 130 of FIG. 6A in an open position. The dispenser 130 can be configured to move between an open position and a closed position.

As illustrated, the dispenser 130 can be removably attached to the opening 22 of the container 20. At least a portion of an expandable sealing plug 140 can be configured to engage with the inner surface of the lip 24 of the opening 22 of the container 20. The expandable sealing plug 140 can be expanded to seal to the opening 22 of the container 20. The dispenser 130 can further include an expanding tube 144 that can be configured to increase in diameter via a ramping screw. The expanding tube 144 can be configured to expand in diameter to expand the expandable sealing plug 140 such that the expandable sealing plug 140 is in contact with the interior surface of the lip 24 of the opening 22 of the container 20. The expandable sealing plug 140 can also be compressed to allow air into the container 20. In this manner, the expandable sealing plug 140 can removably seal the opening of the container. The expandable sealing plug 140 can be configured to prevent liquid from passing between the expandable sealing plug 140 and the lip 24 of the opening 22 of the container 20.

The dispenser 130 can also include an internal tube 142 that extends into the interior of the container 20. The internal tube 142 can define an aperture in fluid communication with the interior of the container 20. The dispenser 130 can further include a seal 136 that is configured to interface with and fit snugly within the inner surface of the tube 142 when the dispenser is in the closed position. The seal 136 can be connected to the nozzle 132. A strut can extend between the seal 136 and the nozzle 132. The nozzle 132 and the seal 136 can be moved up and down to close and open the dispenser 130.

The internal tube 142 can allow liquid to flow from the container 20, through the lumen of the tube 142, around the seal 136 and out through the nozzle 132 to dispense the liquid when the dispenser 130 is in an open position. In some examples, the tube 142 can be positioned centrally within the opening 22 of the container 20. The nozzle 132 can remain outside of the container 20 and can be configured to dispense the liquid when the dispenser 130 is in an open position. The nozzle 132 can act as an activating mechanism for the dispenser 130, such that the nozzle 132 can be pulled or pushed to move the dispenser 130 between a closed position and an open position.

The nozzle 132 and connected seal 136 can be moved up and down relative to the tube 142, which can move the dispenser 130 between a closed position and an open position. As illustrated in FIG. 6A, when the nozzle 132 and therefore the seal 136 is moved upward into the closed position, the nozzle 132 is pushed further into the remainder of the dispenser 130 and externally extends shorter relative to the remainder of the dispenser 130 than the in the open position. In the closed position, the seal 136 can be configured to close an end of the internal tube 142. In this manner, liquid from the container 20 is unable to reach and enter the nozzle 132. Liquid from the container is not permitted to pass the plug seal 136 at the second end of the tube 142. Thus, liquid cannot pass through the tube 142 and the dispenser 130 is in a closed position.

As illustrated in FIG. 6B, the nozzle 132 and therefore the seal 136 is moved downward into the open position. In the open position, the seal 136 is not engaged with the inner surface of the tube 142. In the open position, the nozzle 132 can be pulled out at the first end with the nozzle 110 and externally extends from the container 20, further relative to the remainder of the dispenser 100 in the closed position. This allows liquid in the container 20 to flow through the side openings 116, through the aperture 106 at the second end of the tube 112, through the lumen of the tube 142, past the seal 136 and out through the nozzle 132 to dispense the liquid when the dispenser 130 is in an open position. In the open position, the nozzle 132 and the lumen of the tube 142 can be in fluid communication with an interior of the container 20.

The nozzle 132 can also include an activating mechanism to move the dispenser 130 between the open and closed positions. The activating mechanism may the nozzle 132 that includes one or more grooves 138 that extends around an outer circumference of the nozzle 132. A user can grasp the groove on the nozzle 132 to pull the nozzle 132 and the seal 136 into the open position. The user can also push the nozzle 132 into the closed position, such as by using the groove of the nozzle 132 or by pushing on the end of the tube nozzle 132. The dispenser 130 can further include a spring 134 that is configured to bias the nozzle 132 in the closed position.

Figure 7A:
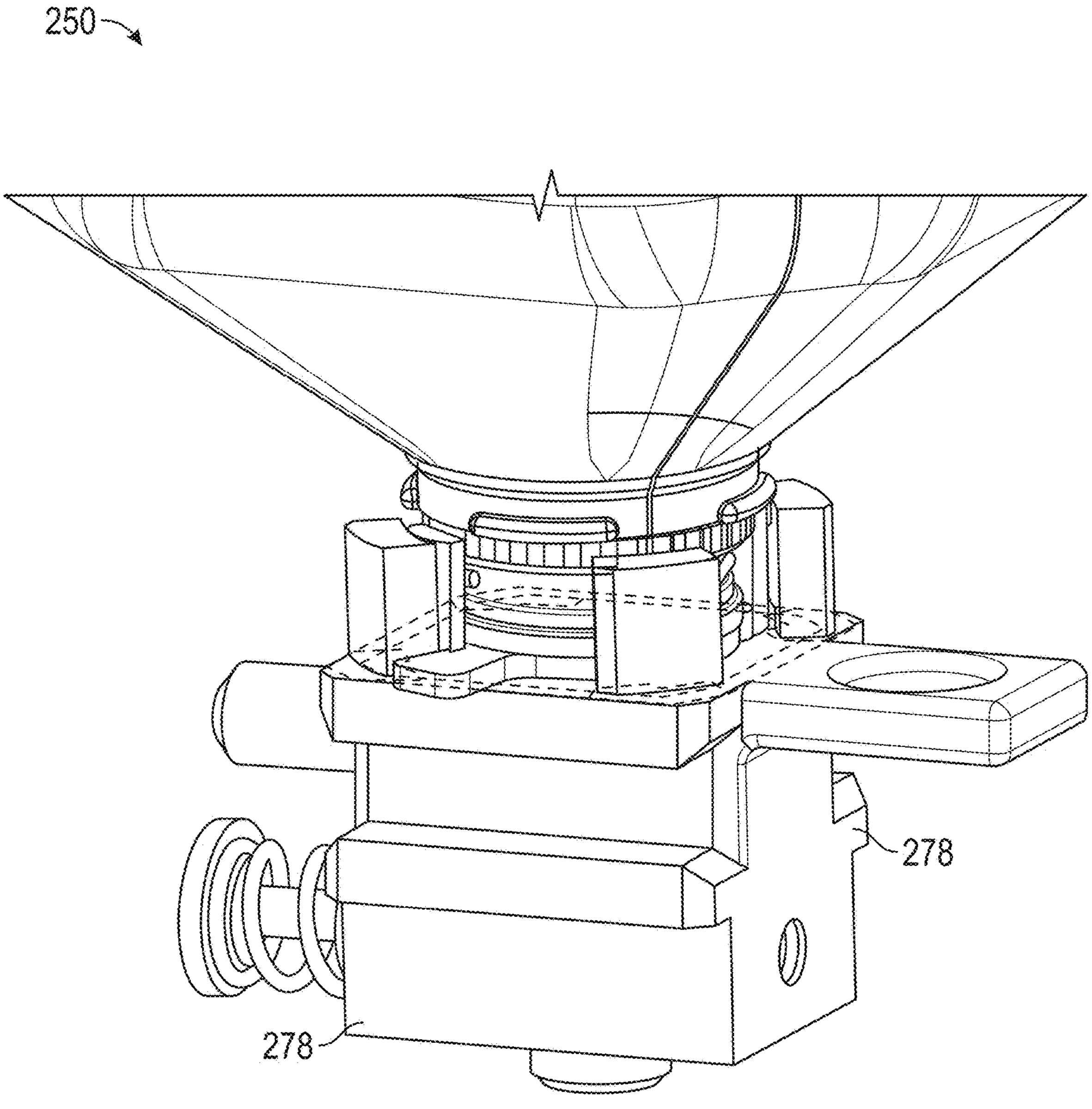
FIG. 7A illustrates a side perspective view of another embodiment of a dispenser in a closed position.
Figure 7B:
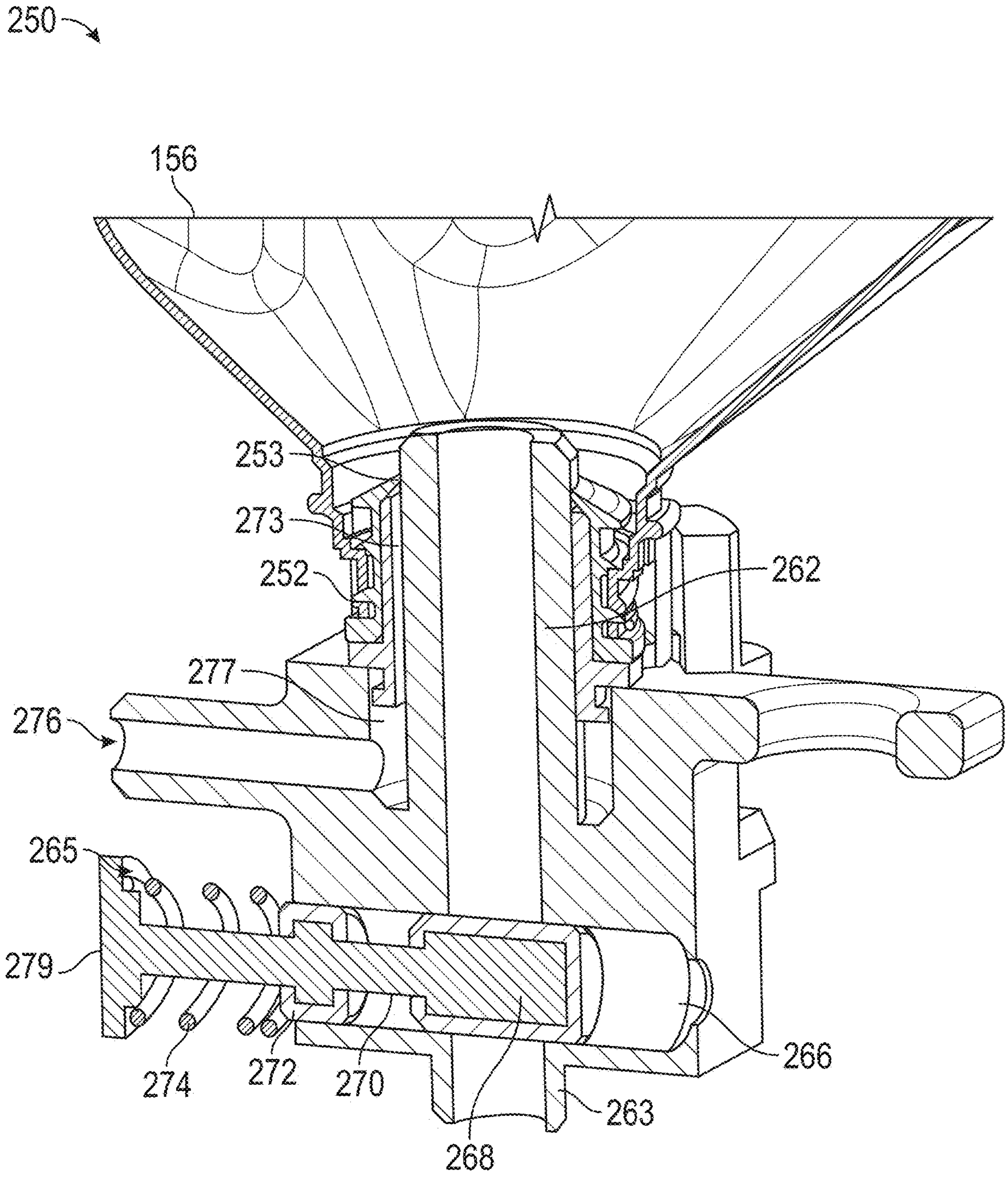
FIG. 7B illustrates a cross-section of the dispenser of FIG. 7A in a closed position.

FIG. 7A illustrates a side perspective view of another embodiment of a dispenser 250 in a closed position. FIG. 7B illustrates a cross-section of the dispenser of FIG. 7A in a closed position.

The dispenser 250 can include a plurality of supports 278. For example, the dispenser 250 can include two supports 278 positioned on opposing sides of the dispenser 250. The supports 278 can be configured to engage with another component, such as a clamp or stand, which can engage the supports 278 and support the weight of the container and the contents therein, as well as the dispenser 250 itself. The container can be positioned upside down with the opening facing downwards. As with embodiments described above, the dispenser 250 can be configured to be positioned within and seal the opening of the container. The dispenser 250 can then be opened to dispense liquid from the container and through the dispenser 250.

The dispenser 250 can be removably inserted into an opening of the container. As with the embodiment of FIG. 5A, the dispenser 250 can include a sealing plug 252. At least a portion of the sealing plug 252 can be configured to engage with the inner surface of the opening of the container. The sealing plug 252 can have a series of ribs or circumferential projections that can be flexible and compress to be inserted into the opening of the container and expand to push against the inner surface of the opening of the container. In this manner, the sealing plug 252 can removably seal the opening of the container. The sealing plug 252 can be configured to prevent liquid from passing between the sealing plug 252 and the opening of the container.

The dispenser 250 can also include a tube 262 (shown in FIG. 7B) that can that has a first open end or inlet that is configured to be in fluid communication with the interior of the container. Liquid from the interior of the container can flow through tube 262 to an outlet 263. The tube 262 can define a lumen extending from one end of the tube 262 to outlet 263 of the tube 262. With reference to FIG. 7B, the lumen of the tube 262 can intersect with a cross lumen 266. In addition, as shown, the tube 262 and cross lumen 266 can be formed as part of a block of material. A valve 265 can be positioned within the cross lumen 266. The valve 265 can include an enlarged portion 268 that can be configured to block the lumen of the tube 262 so as to prevent fluid from flowing out of the container through the tube 262. A neck portion 270 can be positioned adjacent the enlarged portion 268. In the illustrated arrangement, the valve can be pushed forward to align the neck portion 270 with the lumen of the tube 262. With the narrowed neck portion 270 aligned with the lumen of the tube 262, fluid can flow around the neck portion 270 towards the outlet 263. A second enlarged portion 272 can be positioned on the other side of the neck portion 270 opposite the first enlarged portion to prevent fluid from exiting the valve in the open position. The valve 265 can include a handle 279 for moving the valve from an open and closed position. The valve can be configured to move laterally between the open and closed positions. In some examples, the cross lumen 266 can extend across the entire dispenser, such that both ends of the cross lumen 266 are open. This can advantageously allow drainage through the cross lumen or for ease of cleaning. In some examples, the cross lumen 266 can have an open end to receive the valve 265 and an opposing closed end. This can advantageously prevent unwanted material from entering the cross lumen 266. A spring 274 can be provided for biasing the valve to a closed position in which the first enlarged portion 268 blocks flow through the tube 262. In some examples, the dispenser 250 does not include a spring. In some examples, the valve 265 can be actuated with a motor.

As with the embodiment of FIG. 5B, the dispenser 250 can also include an air docking tube 276. The air docking tube 276 can extend substantially perpendicular or transverse to the length of the dispenser 250 and/or the length of the tube 262. In some examples, the air docking tube 276 can extend substantially parallel to the length of the cross lumen 266, as illustrated in FIG. 5B. In some examples, the air docking tube 276 can extend substantially transverse or perpendicular to the length of the cross lumen 266. The air docking tube 276 can be configured to be positioned outside of the container during use. As with the embodiment of FIG. 5B, the dispenser 250 can include an air channel 273 and the sealing plug 252 can include an inner protrusion 253 that acts as a check valve. The dispenser 250 can also include a plenum 277 that is connected to the aperture of the air docking tube 276. The plenum 277 can be a space defined around the exterior of the tube 262. While air fills the plenum 277 through the aperture of the air docking tube 276, the air within the plenum 277 pressurizes. The dispenser 250 can also define one or more air channels 273. The one or more air channels 273 can be connected to plenum 277 at a first end and in fluid communication with the interior of the container at the second end. Air travels from the aperture of the air docking tube 276, into the plenum 277, up through the air channels 273. As with the embodiment of FIG. 5B, the sealing plug 252 can include an inner projection 253. The second ends of the air channels 273 can be covered with the inner projection 253 of the sealing plug 252. The inner projection 253 of the sealing plug 252 can act as a check valve for air traveling from the plenum 277, through the air channel 273 and into the interior of the container. This can allow the check valve to open when air flows through each air channel 273, but each remain closed and prevent liquid from flowing through when air does not flow through the air channel 273.

The air docking tube 276 can include an aperture that allows air to flow from outside of the container and from outside of the dispenser 250, through the aperture of the air docking tube 276, through the air channel 273, and into the container.

Figure 8A:
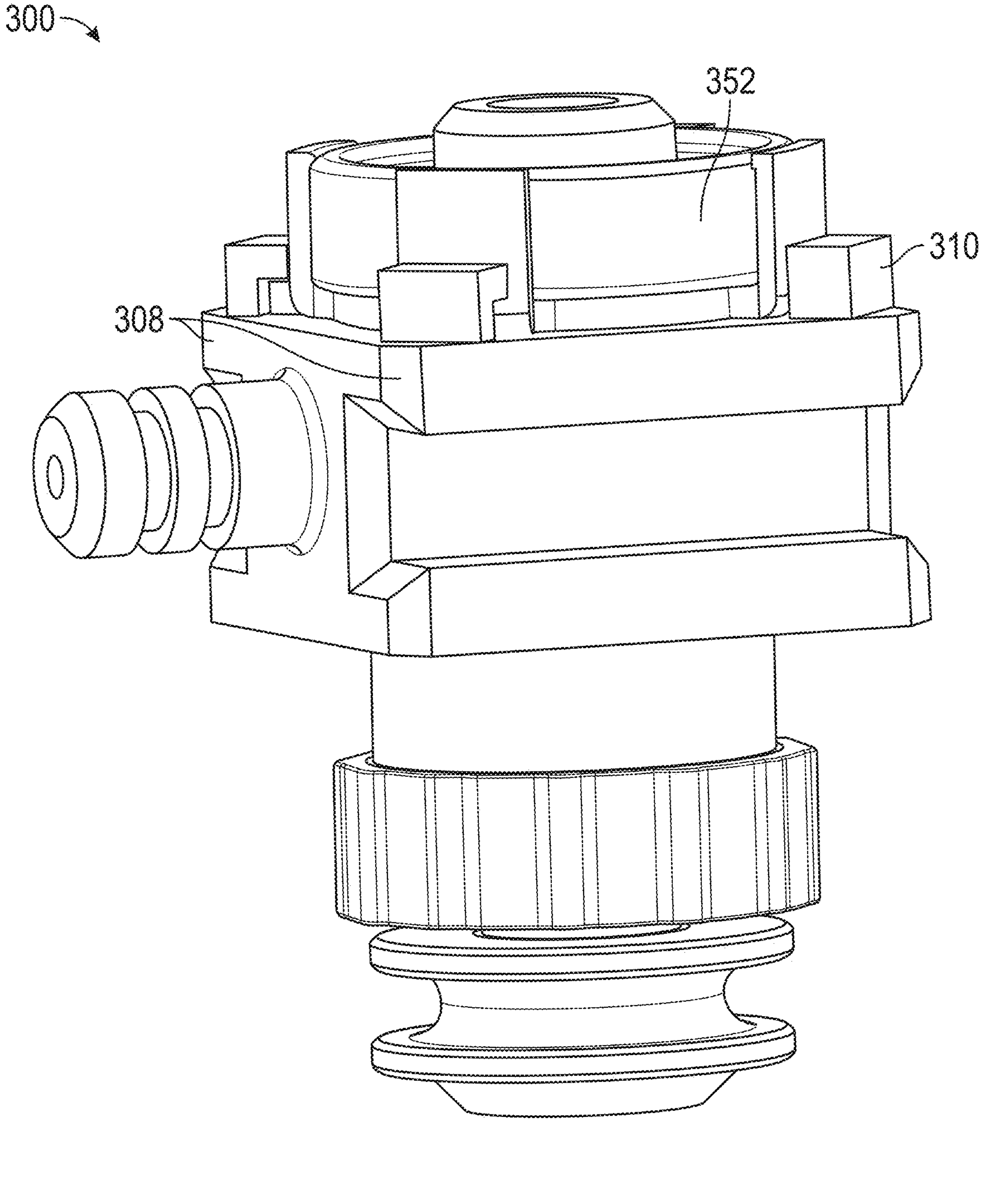
FIG. 8A illustrates a side perspective view of another embodiment of a dispenser in a closed position.
Figure 8B:
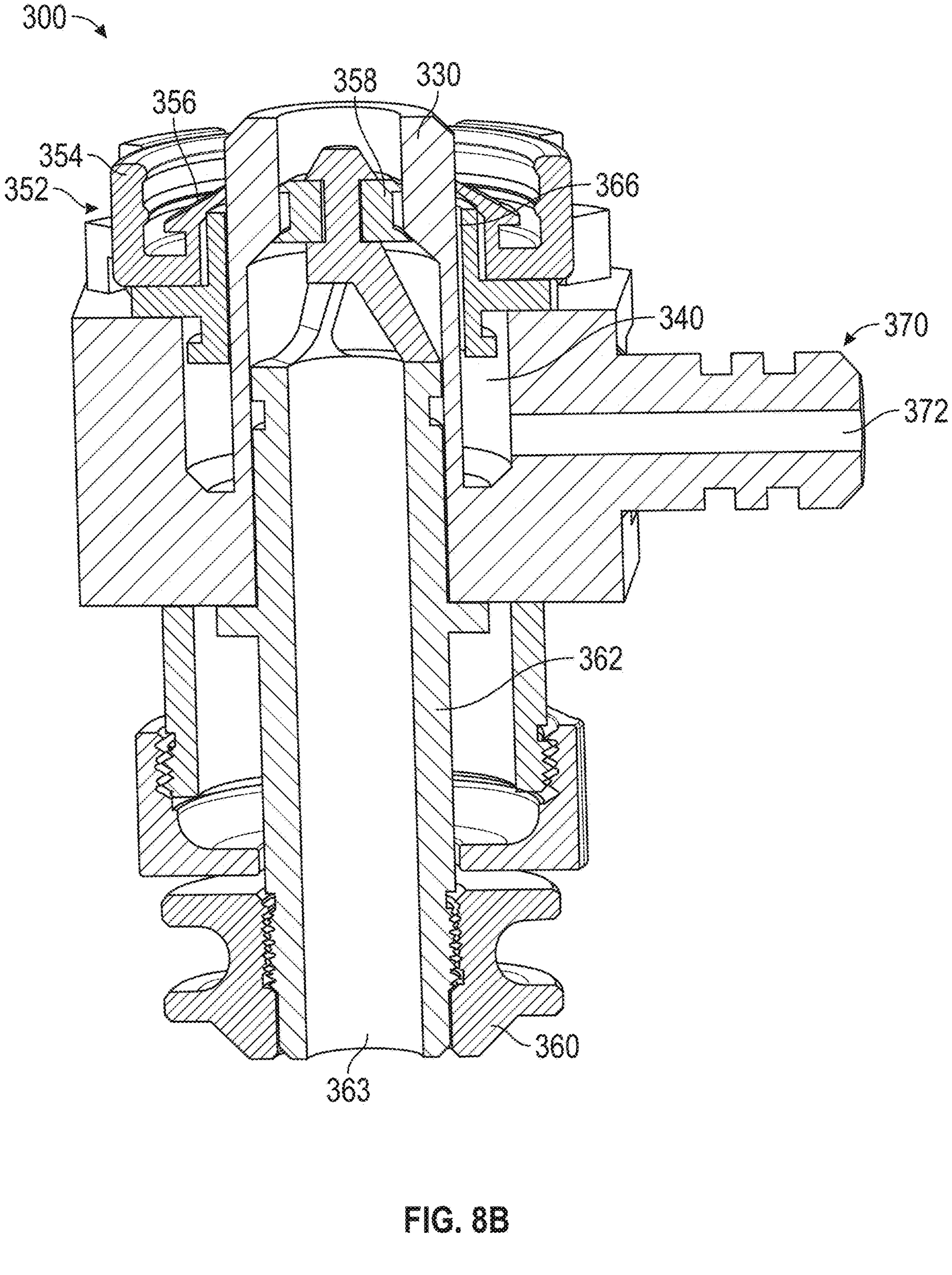
FIG. 8B illustrates a cross-section of the dispenser of FIG. 8A in a closed position.

FIG. 8A illustrates a side perspective view of another embodiment of a dispenser 300 in a closed position. FIG. 8B illustrates a cross-section of the dispenser of FIG. 8A in a closed position.

The dispenser 300 can include a plurality of supports 308. For example, the dispenser 300 can include two supports 308 positioned on opposing sides of the dispenser 300. The supports 308 can be configured to engage with another component, such as a clamp or stand, which can engage the supports 308 and support the weight of the container and the contents therein, as well as the dispenser 300 itself. The container can be positioned upside down with the opening facing downwards. As with embodiments described above, the dispenser 300 can be configured to be positioned within and seal the opening of the container. The dispenser 300 can then be opened to dispense liquid from the container and through the dispenser 300.

The dispenser 300 can be removably inserted into an opening of the container. As with the embodiments described above, the dispenser 300 can include a sealing plug 352. The sealing plug 352 can have an outer wall 354 and an inner wall 356. The outer wall 354 can be configured to engage with the inner surface of the opening of the container. The outer surface of the outer wall 354 of the sealing plug 352 can be smooth. The dispenser 300 can further include a series of fasteners 310. In the illustrated example, the dispenser 300 includes four fasteners. The sealing plug 352 can be inserted into the opening of the container. The fasteners 310 can be positioned on the outer surface of the opening of the container. The sealing plug 352 can be made of a flexible material that is able to be compressed or deflected such that the wall of the opening of the container can be inserted between the sealing plug 352 and each of the fasteners 310. In this manner, the sealing plug 352 can removably seal the opening of the container. The sealing plug 352 can be configured to prevent liquid from passing between the sealing plug 352 and the opening of the container.

The dispenser 300 can include a stationary tube 330. The inner wall 356 of the sealing plug 352 can define an aperture to receive at least a portion of the stationary tube 330. The first end of the stationary tube can be an open end that is configured to be in fluid communication with the interior of the container. Liquid from the interior of the container can flow through the first end of the stationary tube 362. The inner lumen of the stationary tube 330 can include a narrowed portion at one end of the stationary tube 330. In the narrowed portion, the inner lumen can have a smaller diameter than the remainder of the inner lumen.

The dispenser 300 can also include a sliding tube 362 that can slide relative to the dispenser 300. The sliding tube 362 can be positioned within the inner lumen of the stationary tube 330. The sliding tube 362 can include one end with a nozzle 360 and an opposing second end with a plug 358. The nozzle 360 can remain outside of the container and can be configured to dispense the liquid when the dispenser 300 is in an open position. The nozzle 360 can act as an activating mechanism for the dispenser 300, such that the nozzle 360 can be pulled or pushed to move the dispenser 300 between a closed position and an open position. The second end of the sliding tube 362 can include a plug 358. The plug 358 can attach to the second end of the sliding tube 162 via a series of one or more struts. The plug 358 can be configured to prevent flow of liquid from entering the sliding tube 362. The change in diameter of the lumen of the stationary tube 330 allows the position of the plug 358 to control flow through the dispenser 300. When the sliding tube 362 is positioned higher, the plug 358 can be positioned higher within the lumen of the stationary tube 330. The plug 158 can have a diameter that matches the diameter of the narrowed portion of the lumen of the stationary tube 330. The plug 358 can be positioned within the narrowed portion of the inner lumen of the stationary tube 330, thus sealing the lumen of the stationary tube 330 and preventing liquid from the container into the dispenser 300 the dispenser 300 is in the closed position.

The sliding tube 362 can be moved up and down relative to the remainder of the dispenser 300 and the container, which can move the dispenser 300 between a closed position and an open position. As illustrated in FIG. 8B, when the tube 162 is moved up into the closed position, the tube 362 externally extends shorter relative to the remainder of the dispenser 300 than the in the open position. Additionally, in the closed position, the plug 358 of the sliding tube 362 interfaces with the side walls of the narrowed portion of the lumen of the stationary tube 330, such that the liquid is prevented from reaching the lumen of the tube 162. Thus, in the closed position, liquid from the container is unable to reach and enter the lumen of the sliding tube 362. Thus, liquid cannot pass through the siding tube 362 and the dispenser 300 is in a closed position.

Similar to the embodiment described in FIG. 5C, the sliding tube 362 can be positioned lower to an open position. The sliding tube 362 can be pulled out at the end with the nozzle 360 and externally extends from the container further relative to the remainder of the dispenser 300 than in the closed position. The sliding tube 362 extends within the lumen of the stationary tube 330, such that the plug 358 is positioned within the wider portion of the lumen of the stationary tube 330. In the open position, the lumen of the sliding tube 362 can be in fluid communication with an interior of the container. This allows liquid to flow from the interior of the container, through the lumen of the stationary tube 330, around the plug 158, around the struts, and through the lumen of the sliding tube 362 for dispensing when the dispenser 150 is in the open position.

The sliding tube 362 can also include an activating mechanism to move the dispenser 300 between the open and closed positions. The activating mechanism may be the nozzle 360 that includes one or more protrusions or ridges on the outer surface of the sliding tube 362 and can be positioned at the end of the sliding tube 362. A user can grasp the protrusions on the nozzle 360 to pull or push the sliding tube 162 between the open and the closed positions.

As with the embodiment of FIGS. 5A-5C, the dispenser 300 can also include an air docking tube 370. The air docking tube 370 can extend substantially perpendicular or transverse to the length of the dispenser 300 and/or the length of the sliding tube 362. The air docking tube 370 can be configured to be positioned outside of the container during use. The air docking tube 370 can include an aperture 372 that allows air to flow from outside of the container and from outside of the dispenser 300, through the aperture 372 of the air docking tube 370, and into the container.

The dispenser 300 can define a plenum 340 that is connected to the aperture 372 of the air docking tube 370. The plenum 340 can be a space defined around the exterior of the stationary tube 330. While air fills the plenum 340 from the aperture 372 of the air docking tube 370, the air within the plenum 340 pressurizes. The dispenser 300 can also define one or more air channels 366. The one or more air channels 366 can be connected to plenum 340 at a first end and in fluid communication with the interior of the container at the second end. Air travels from the aperture 372 of the air docking tube 370, into the plenum 340, up through the air channels 366. The second ends of the air channels 366 can be covered with the inner wall 356 of the sealing plug 352. The inner wall 356 of the sealing plug 352 can act as a check valve for air traveling from the plenum, through the air channel 366 and into the interior of the container. This can allow the check valve to open when air flows through each air channel 366, but each remain closed and prevent liquid from flowing through when air does not flow through the air channel 366. In some examples, the dispenser 300 can include a spring that biases the dispenser 300 in the closed position. In other examples, the dispenser 300 does not include a spring.

Certain Terminology

As used herein, the term "beverage" has its ordinary and customary meaning, and includes, among other things, any edible liquid or substantially liquid substance or product having a flowing quality (e.g., juices, coffee beverages, teas, milk, beer, wine, cocktails, liqueurs, spirits, cider, soft drinks, flavored water, energy drinks, soups, broths, combinations of the same, or the like).

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. Numbers preceded by a term such as "about" or "approximately" include the recited numbers and should be interpreted based on the circumstances (e.g., as accurate as reasonably possible under the circumstances, for example. For example, "about 1 gram" includes "1 gram." In the embodiments described in this application, terms such as "about" or "approximately" within the specification or claims that precede values or ranges can be omitted such that this application specifically includes embodiments of the recited values or ranges with the terms "about" or "approximately" omitted from such values and ranges such that they can also be claimed without the terms "about" or "approximately" before the disclosed range. The term "generally" as used herein represents a value, amount, or characteristic that predominantly includes, or tends toward, a particular value, amount, or characteristic. As an example, in certain embodiments, as the context may dictate, the term "generally parallel" can refer to something that departs from exactly parallel by less than or equal to 20 degrees and/or the term "generally perpendicular" can refer to something that departs from exactly perpendicular by less than or equal to 20 degrees.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

The following example embodiments identify some possible permutations of combinations of features disclosed herein, although other permutations of combinations of features are also possible.

Summary

Although certain aspects, advantages, and features are described herein, it is not necessary that any particular embodiment include or achieve any or all of those aspects, advantages, and features. For example, some embodiments may not achieve the advantages described herein, but may achieve other advantages instead. Any structure, feature, or step in any embodiment can be used in place of, or in addition to, any structure, feature, or step in any other embodiment, or omitted. This disclosure contemplates all combinations of features from the various disclosed embodiments. No feature, structure, or step is essential or indispensable In addition, although this disclosure describes certain embodiments and examples of beverage systems and methods, many aspects of the above-described systems and methods may be combined differently and/or modified to form still further embodiments or acceptable examples. All such modifications and variations are intended to be included herein within the scope of this disclosure.

Also, although there may be some embodiments within the scope of this disclosure that are not expressly recited above or elsewhere herein, this disclosure contemplates and includes all embodiments within the scope of what this disclosure shows and describes. Further, this disclosure contemplates and includes embodiments comprising any combination of any structure, material, step, or other feature disclosed anywhere herein with any other structure, material, step, or other feature disclosed anywhere herein.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Some embodiments have been described in connection with the accompanying drawings. The figures are drawn to scale, but such scale should not be interpreted to be limiting. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Also, any methods described herein may be practiced using any device suitable for performing the recited steps.

Moreover, while components and operations may be depicted in the drawings or described in the specification in a particular arrangement or order, such components and operations need not be arranged and performed in the particular arrangement and order shown, nor in sequential order, nor include all of the components and operations, to achieve desirable results. Other components and operations that are not depicted or described can be incorporated in the embodiments and examples. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products.

In summary, various illustrative embodiments and examples of beverage dispensing systems and methods have been disclosed. Although the systems and methods have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims that follow as well as their full scope of equivalents.

What is claimed is:

1. An apparatus for dispensing a liquid, the apparatus comprising:

a dispenser configured to be coupled to a container and configured to move between an open position and a closed position, the dispenser comprising an outlet an air docking tube extending perpendicular to a length of the dispenser measured along an axis extending through the outlet of the dispenser and the container when the dispenser is coupled to the container, wherein, in the open position, the dispenser is configured to dispense the liquid from the container through the outlet of the dispenser when the container is in an inverted position with an opening of the container facing downward, and wherein the outlet of the dispenser is positioned below and aligned with the opening of the container when the container is in the inverted position.

2. The apparatus of claim 1, wherein the dispenser comprises a cap and a tube.

3. The apparatus of claim 2, wherein the cap comprises an inner wall and an outer wall, wherein the inner wall and the outer wall are configured to be positioned on opposing sides of a lip of an opening of the container.

4. The apparatus of claim 3, wherein the dispenser further comprises a sealing plug and a check valve between the inner wall of the cap and the lip of the opening of the container, wherein the sealing plug and the check valve are removable from the dispenser.

5. The apparatus of claim 4, wherein the inner wall of the cap defines an aperture in fluid communication with the opening of the container.

6. The apparatus of claim 1, wherein the dispenser further comprises a sealing plug configured to engage with an inner surface of the opening of the container.

7. The apparatus of claim 6, wherein the sealing plug comprises a central aperture.

8. The apparatus of claim 7, wherein the central aperture of the sealing plug is configured to receive a tube.

9. The apparatus of claim 1, further comprising an air channel in fluid communication with an aperture of the air docking tube.

10. The apparatus of claim 9, further comprising an air curtain deflector configured to redirect air flowing through the air channel.

11. The apparatus of claim 1, wherein the dispenser comprises a tube, wherein the tube comprises a plug configured to be positioned within an aperture of the dispenser to prevent flow through the aperture of the dispenser.

12. An apparatus for dispensing a liquid, the apparatus comprising:

a dispenser comprising:

a tube comprising a lumen with an inlet and an outlet;

a cross lumen intersecting with the lumen of the tube between the inlet and the outlet of the tube, wherein a length of the cross lumen extends substantially perpendicular to the lumen of the tube; and a valve positioned within the cross lumen, the valve comprising a body having an enlarged portion configured to block the lumen of the tube and a neck portion configured to allow liquid to flow from the lumen of the tube and around the neck portion, wherein a diameter of the neck portion is smaller than a diameter of the enlarged portion, wherein the dispenser is configured to receive a container in an upside down position, such that an opening of the container is positioned below a remainder of the container, the dispenser configured to move between an open position and a closed position, wherein, in the open position, the dispenser is configured to dispense the liquid from the container.

13. The apparatus of claim 12, wherein the enlarged portion is positioned adjacent to the neck portion, wherein the valve is configured to move laterally between a first position and a second position, wherein in the first position the enlarged portion is aligned with the lumen of the tube, wherein in the second position the neck portion is aligned with the lumen of the tube to allow liquid from the lumen of the tube and around the neck portion.

14. The apparatus of claim 12, wherein the valve comprises a handle for moving the valve between a first position and a second position.

15. The apparatus of claim 12, wherein the body of the valve further comprises a second enlarged portion.

16. The apparatus of claim 15, wherein the enlarged portion is positioned adjacent to the neck portion on a first side, wherein the second enlarged portion is positioned adjacent to the neck portion on an opposing second side.

17. The apparatus of claim 12, wherein the dispenser further comprises a spring positioned to bias the valve to a closed position.

18. The apparatus of claim 12, wherein the dispenser further comprises an air docking tube extending substantially perpendicular to a length of the dispenser.

19. The apparatus of claim 18, wherein the air docking tube extends substantially perpendicular to a length of the cross lumen.

20. The apparatus of claim 18, wherein the dispenser further comprises an air channel in fluid communication with an aperture of the air docking tube.

21. The apparatus of claim 20, wherein the dispenser further comprises a plenum connected to the aperture of the air docking tube and the air channel.

22. The apparatus of claim 20, wherein the dispenser further comprises a sealing plug.

23. The apparatus of claim 12, wherein the cross lumen comprises a first open end to receive the valve and second closed end.

24. The apparatus of claim 12, wherein the cross lumen comprises a first open end and a second open end.

25. The apparatus of claim 12, wherein the valve is actuated by a motor.

26. The apparatus of claim 12, wherein the cross lumen comprises a first open end to receive the valve and second closed end.

27. An apparatus for dispensing a liquid, the apparatus comprising:

a dispenser comprising:

a tube comprising a lumen with an inlet and an outlet;

a cross lumen intersecting with the lumen of the tube between the inlet and the outlet of the tube, wherein a length of the cross lumen extends substantially perpendicular to the lumen of the tube;

a valve positioned within the cross lumen, wherein the dispenser is configured to receive a container in an upside down position, such that an opening of the container is positioned below a remainder of the container, the dispenser configured to move between an open position and a closed position;

an air docking tube extending substantially perpendicular to a length of the dispenser;

an air channel in fluid communication with an aperture of the air docking tube; and a sealing plug configured to prevent liquid from passing between the sealing plug and the opening of the container when the container is received by the dispenser, wherein the sealing plug comprises an inner protrusion that extends radially inward from an inner wall of the sealing plug, wherein, in the open position, the dispenser is configured to dispense the liquid from the container.

28. The apparatus of claim 27, wherein the inner protrusion acts as a check valve for the air channel.

* * * * *